(12) United States Patent
Aono et al.

(10) Patent No.: US 12,473,951 B2
(45) Date of Patent: Nov. 18, 2025

(54) CLUTCH DEVICE AND MOTORCYCLE

(71) Applicant: Kabushiki Kaisha F.C.C., Hamamatsu (JP)

(72) Inventors: Yuki Aono, Hamamatsu (JP); Junichi Nishikawa, Hamamatsu (JP)

(73) Assignee: KABUSHIKI KAISHA F.C.C., Shizuoka (JP)

(*) Notice: Subject to any disclaimer, the term of this patent is extended or adjusted under 35 U.S.C. 154(b) by 0 days.

(21) Appl. No.: 18/700,071

(22) PCT Filed: Oct. 3, 2022

(86) PCT No.: PCT/JP2022/037003
§ 371 (c)(1),
(2) Date: Apr. 10, 2024

(87) PCT Pub. No.: WO2023/063153
PCT Pub. Date: Apr. 20, 2023

(65) Prior Publication Data
US 2025/0237274 A1    Jul. 24, 2025

(30) Foreign Application Priority Data

Oct. 14, 2021  (JP) .................................. 2021-168978
Jul. 5, 2022   (JP) .................................. 2022-108653

(51) Int. Cl.
*F16D 13/52* (2006.01)
*F16D 13/74* (2006.01)
*F16D 23/12* (2006.01)

(52) U.S. Cl.
CPC ............. *F16D 13/74* (2013.01); *F16D 13/52* (2013.01); *F16D 23/12* (2013.01); *F16D 2023/123* (2013.01)

(58) Field of Classification Search
CPC .... F16D 2023/123; F16D 13/72; F16D 13/74; F16D 13/52
See application file for complete search history.

(56) References Cited

U.S. PATENT DOCUMENTS 9,689,439 B2 *   6/2017  Miyazaki ................ F16D 13/56
2009/0071792 A1 * 3/2009  Kataoka .................. F16D 13/54
                                                     192/93 R (Continued)

FOREIGN PATENT DOCUMENTS

CN    111255815 A      6/2020
EP    3 366 939 A1     8/2018

(Continued)

OTHER PUBLICATIONS

Official Communication issued in corresponding Japanese Patent Application No. 2022-162731, mailed on Jul. 30, 2024, 3 pages.

(Continued)

Primary Examiner — Stacey A Fluhart
(74) Attorney, Agent, or Firm — Keating & Bennett, LLP

(57) ABSTRACT

A clutch device includes a clutch center holding an output-side rotating plate facing an input-side rotating plate and a plate presser pressing the input-side rotating plate or the output-side rotating plate. The clutch center includes a driven shaft coupling portion coupled with a tip portion of a shaft. The plate presser includes a center cylindrical portion including a center fitting portion slidably fitted to an outer surface of the driven shaft coupling portion and an oil receiver located adjacent to the center fitting portion to receive clutch oil flowing out of the tip portion of the shaft.

25 Claims, 11 Drawing Sheets

(56) References Cited

U.S. PATENT DOCUMENTS

| | | | |
|---|---|---|---|
| 2010/0163361 A1 | 7/2010 | Suzuta et al. | |
| 2011/0073429 A1* | 3/2011 | Gokan | F16D 13/56 |
| | | | 192/54.5 |
| 2015/0041275 A1 | 2/2015 | Satou et al. | |
| 2018/0180113 A1* | 6/2018 | Tokito | F16H 57/0427 |
| 2019/0027369 A1* | 1/2019 | Kori | G03F 7/11 |
| 2019/0257369 A1 | 8/2019 | Tabinoki | |
| 2019/0285123 A1* | 9/2019 | Imanishi | F16D 13/56 |
| 2020/0292010 A1 | 9/2020 | Kobayashi et al. | |

FOREIGN PATENT DOCUMENTS

| | | |
|---|---|---|
| JP | 43-31768 Y | 12/1968 |
| JP | S5628321 A | 3/1981 |
| JP | 2009068578 A | 4/2009 |
| JP | 2010-151232 A | 7/2010 |
| JP | 2013-104544 A | 5/2013 |
| JP | 2018-105480 A | 7/2018 |
| JP | 2018-141480 A | 9/2018 |
| JP | 2019-078373 A | 5/2019 |

OTHER PUBLICATIONS

Official Communication issued in corresponding European Patent Application No. 25166745.7, mailed on May 9, 2025, 9 pages.
Official Communication issued in International Patent Application No. PCT/JP2022/037003, mailed on Dec. 6, 2022.

* cited by examiner

CLUTCH DEVICE AND MOTORCYCLE

BACKGROUND OF THE INVENTION

1. Field of the Invention

The present invention relates to a clutch device allowing or blocking transfer of a rotation driving force of a drive shaft, rotationally drivable by a prime mover, to a driven shaft driving a driven body, and a motorcycle including the same.

2. Description of the Related Art

Conventionally, a vehicle such as a two-wheeled vehicle (motorcycle), a four-wheeled vehicle or the like includes a clutch device located between a prime mover such as an engine or the like and a driven body such as a wheel or the like to allow or block transfer of a rotation driving force of the prime mover to the driven body. In general, in such a clutch device, a plurality of input-side rotating plates rotatable by a rotation driving force of the prime mover and a plurality of output-side rotating plates coupled with the driven body are opposed to each other, and are put into close contact with, or are separated from, each other. In this manner, the clutch device may optionally allow or block transfer of the rotation driving force.

For example, Japanese Patent Application Publication No. 2010-151232 discloses a clutch device including a center clutch coupled with a driven body via a shaft to hold the output-side rotating plates and a pressure clutch pressing the output-side rotating plates held by the center clutch, the pressure clutch being fitted to an inner circumferential portion of a center-side fitting portion of the center clutch to be slidable relative to the center clutch in an axial direction. In this case, the center-side fitting portion is formed in the vicinity of the inner circumferential portion of the output-side rotating plates and the input-side rotating plates, which are at a diametrically outer position of the clutch device in consideration of the ease of spreading clutch oil, flowing out of a tip of the shaft, in the clutch device.

SUMMARY OF THE INVENTION

However, the clutch device described in Japanese Patent Application Publication No. 2010-151232 has a problem that the center-side fitting portion is formed at the diametrically outer position in the clutch device, and therefore, the slidable portion needs to have a long diameter and thus has a large sliding resistance, which makes it difficult to decrease the size of the clutch device.

Example embodiments of the present invention provide clutch devices that are decreased in size and motorcycles including the same.

According to an example embodiment of the present invention, a clutch device for allowing or blocking transfer of a rotation driving force of a drive shaft to a driven shaft includes a clutch center including a plate holder holding an output-side rotating plate facing an input-side rotating plate rotationally drivable by rotational driving of the drive shaft, the clutch center being rotationally drivable together with the driven shaft, a plate presser facing the clutch center and displaceable toward or away from the clutch center and rotatable with respect to the clutch center to press the input-side rotating plate or the output-side rotating plate, and a center cylindrical portion, wherein the clutch center includes a driven shaft coupling portion coupled with a tip portion of the driven shaft, and the center cylindrical portion includes a center fitting portion slidably fitted to the driven shaft coupling portion and a cylindrical oil receiver adjacent to the center fitting portion to receive clutch oil flowing out of a flow-out portion of the driven shaft.

According to this example embodiment of the present invention having the above-described configuration, in the clutch device, the center fitting portion of the center cylindrical portion of the plate presser is slidably fitted to the outer surface of the driven shaft coupling portion of the clutch center, and the oil receiver of the center cylindrical portion receives the clutch oil flowing out of the flow-out portion of the driven shaft. With this configuration, the clutch oil flowing out of the driven shaft may be effectively guided to a sliding portion along which the clutch center and the plate presser slide against each other and then caused to flow to the outside of the sliding portion (outside of the center cylindrical portion). Thus, the clutch oil may lubricate the inside of the clutch device. That is, in a clutch device according to an example embodiment of the present invention, the sliding portion of the clutch center and the plate presser may be provided at the driven shaft coupling portion, which is close to a central portion of the clutch center. Thus, the clutch device may make the sliding portion small, and thus may be decreased in size.

According to another example embodiment of the present invention, the oil receiver includes a slope at least at a portion of an inner circumferential surface thereof, the slope expanding diametrically outward toward the center fitting portion.

According to this example embodiment of the present invention having the above-described configuration, the clutch oil flowing out of the driven shaft may be effectively guided toward the center fitting portion. Therefore, the clutch oil may be guided to the sliding portion of the clutch center and the plate presser more effectively and then caused to flow to the outside of the sliding portion (outside of the center cylindrical portion). Thus, the clutch oil may lubricate the inside of the clutch device.

According to another example embodiment of the present invention, in the clutch device, the center cylindrical portion includes an oil path expansion portion in a circumferential direction in which the center fitting portion is provided, the oil path expansion portion expanding diametrically outward and defining a gap between the oil path expansion portion and an outer circumferential portion of the driven shaft coupling portion.

According to this example embodiment of the present invention having the above-described configuration, the clutch device includes the oil path expansion portion in a portion of the center cylindrical portion in a circumferential direction in which the center fitting portion is provided. The oil path expansion portion expands diametrically outward and defines a gap between the oil path expansion portion and the outer circumferential portion of the driven shaft coupling portion. Therefore, the clutch oil in the center cylindrical portion may be effectively guided to the outside of the center cylindrical portion via the oil path expansion portion. The gap between the oil path expansion portion and the driven shaft coupling portion by the oil path expansion portion is larger than the gap between the driven shaft coupling portion and the center fitting portion.

According to another example embodiment of the present invention, the oil path expansion portion extends from the center fitting portion to the oil receiver.

According to this example embodiment of the present invention having the above-described configuration, in the clutch device, the oil path expansion portion reaches the oil receiver, or extends to enter the oil receiver, from the center fitting portion. Therefore, the clutch oil in the center cylindrical portion may be effectively guided to the outside of the center cylindrical portion via the oil path expansion portion.

According to another example embodiment of the present invention, the center cylindrical portion includes an opening in a portion thereof in a circumferential direction in which the center fitting portion is provided, the opening being defined by a cut-off portion.

According to this example embodiment of the present invention having the above-described configuration, the clutch device includes the opening in a portion of the center cylindrical portion in a circumferential direction in which the center fitting portion is provided. The opening is defined by a cut-off portion. Therefore, the clutch oil in the center cylindrical portion may be effectively guided to the outside of the center cylindrical portion via the opening.

According to another example embodiment of the present invention, the opening faces a central portion of the plate holder in an axial direction thereof.

According to this example embodiment of the present invention having the above-described configuration, in the clutch device, the opening is at a position facing the central portion of the plate holder in the axial direction thereof. Therefore, the clutch oil in the center cylindrical portion may be effectively guided to the outside of the center cylindrical portion, more specifically, to the central portion of the plate holder in the axial direction thereof, via the opening. That is, the clutch device may supply the clutch oil in the center cylindrical portion to the central portion, where the input-side rotating plate and the output-side rotating plate are aligned, and thus may effectively supply the clutch oil to the entirety of the input-side rotating plate and the output-side rotating plate. The central portion of the plate holder in the axial direction, at which the opening is provided, is not necessarily the central portion in a strict sense, but includes the central portion and the vicinity thereof.

According to another example embodiment of the present invention, the opening extends from the center fitting portion to the oil receiver.

According to this example embodiment of the present invention having the above-described configuration, in the clutch device, the opening reaches the oil receiver, or extends to enter the oil receiver, from the center fitting portion. Therefore, the clutch oil in the center cylindrical portion may be effectively guided to the outside of the center cylindrical portion via the opening.

When the input-side rotating plate and the output-side rotating plate are in pressure contact with each other, abrasion of these rotating plates may be alleviated in the case where the clutch oil is supplied to these rotating plates in a sufficient amount. Therefore, in a configuration in which the clutch oil flows out of the tip portion of the shaft, as in the clutch device in Japanese Patent Application Publication No. 2010-151232, it is desired that the clutch oil should be guided to the input-side rotating plate and the output-side rotating plate more effectively.

Example embodiments of the present invention provide clutch devices each capable of supplying a larger amount of clutch oil to the input-side rotating plate and the output-side rotating plate.

According to another example embodiment of the present invention, a clutch device for allowing or blocking transfer of a rotation driving force of a drive shaft to a driven shaft includes a clutch center including a plate holder holding an output-side rotating plate facing an input-side rotating plate rotationally drivable by rotational driving of the drive shaft, the clutch center being rotationally drivable together with the driven shaft, a plate presser facing the clutch center and displaceable toward or away from the clutch center and rotatable with respect to the clutch center to press the input-side rotating plate or the output-side rotating plate, and a center cylindrical portion, wherein the clutch center includes a driven shaft coupling portion coupled with a tip portion of the driven shaft, and the center cylindrical portion includes a center fitting portion slidably fitted to the driven shaft coupling portion and a recessed portion provided in a portion of the plate presser in a circumferential direction in which the center fitting portion is provided, the recessed portion expanding diametrically outward and defining a gap between the recessed portion and an outer circumferential portion of the driven shaft coupling portion to enable clutch oil to flow out of a flow-out portion of the driven shaft and to flow into the recessed portion.

According to this example embodiment of the present invention having the above-described configuration, the clutch oil flowing out of the flow-out portion of the driven shaft flows in the recessed portion. The recessed portion defines a gap between the recessed portion and the outer circumferential portion of the driven shaft coupling portion. Therefore, the clutch oil flowing in the recessed portion flows to the outside of the center cylindrical portion more effectively, and thus a larger amount of the clutch oil may be supplied to the input-side rotating plate and the output-side rotating plate.

According to another example embodiment of the present invention, the clutch center includes the clutch center includes a plurality of center-side cam portions located diametrically outward of the driven shaft coupling portion, the plurality of center-side cam portions each including a center-side assist cam surface to generate a force in a direction from the plate presser toward the clutch center, in order to increase a pressing force between the input-side rotating plate and the output-side rotating plate, when the clutch center rotates with respect to the plate presser, and also including a center-side slipper cam surface to separate the plate presser from the clutch center, in order to decrease the pressing force between the input-side rotating plate and the output-side rotating plate, when the clutch center rotates with respect to the plate presser, the plate presser includes a plurality of presser-side cam portions located diametrically outward of the center cylindrical portion, the plurality of presser-side cam portions each including a presser-side assist cam surface contactable with the center-side assist cam surface to generate a force in a direction from the plate presser toward the clutch center, in order to increase the pressing force between the input-side rotating plate and the output-side rotating plate, when the plate presser rotates with respect to the clutch center, and also including a presser-side slipper cam surface contactable with the center-side slipper cam surface to separate the plate presser from the clutch center, in order to decrease the pressing force between the input-side rotating plate and the output-side rotating plate, when the plate presser rotates with respect to the clutch center, and the recessed portion is located between two of the presser-side cam portions adjacent to each other in the circumferential direction.

According to this example embodiment of the present invention having the above-described configuration, the recessed portion is located between two of the presser-side cam portions adjacent to each other in the circumferential direction. With this configuration, the clutch oil flowing in the recessed portion and then flowing to the outside of the center cylindrical portion flows to the input-side rotating plate and the output-side rotating plate more easily.

According to another example embodiment of the present invention, regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, the recessed portion is located closer to the presser-side assist cam surface.

According to this example embodiment of the present invention having the above-described configuration, the recessed portion is located closer to the presser-side assist cam surface. With this configuration, the clutch oil flowing to the outside of the center cylindrical portion is effectively supplied also to the presser-side assist cam surface, and therefore, may alleviate abrasion of the presser-side assist cam surface and the center-side assist cam surface.

According to another example embodiment of the present invention, regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, the recessed portion is located closer to the presser-side slipper cam surface.

According to this example embodiment of the present invention having the above-described configuration, the recessed portion is located closer to the presser-side slipper cam surface. The stress applied to the presser-side slipper cam surface is smaller than the stress applied to the presser-side assist cam surface. Therefore, the recessed portion is provided closer to the presser-side slipper cam surface, so that the clutch oil may be caused to flow to the outside of the center cylindrical portion while the strength of the center cylindrical portion is kept sufficiently high.

According to another example embodiment of the present invention, the recessed portion is provided in an entirety of a region of the center cylindrical portion extending from at least a central portion in an axial direction thereof to an end thereof on a side of the clutch center.

According to this example embodiment of the present invention having the above-described configuration, the clutch oil flowing out of the flow-out portion of the driven shaft may be caused to flow to the outside of the center cylindrical portion more certainly, and thus a larger amount of the clutch oil may be supplied to the input-side rotating plate and the output-side rotating plate.

According to another example embodiment of the present invention, the recessed portion is provided in the center cylindrical portion so as to expand diametrically outward.

According to this example embodiment of the present invention having the above-described configuration, the recessed portion of the plate presser is provided in the center cylindrical portion so as to expand diametrically outward. With this configuration, the clutch oil flowing in the recessed portion flows to the outside of the center cylindrical portion more effectively, and thus a larger amount of the clutch oil may be supplied to the input-side rotating plate and the output-side rotating plate.

According to another example embodiment of the present invention, the recessed portion is located closer to the presser-side assist cam surface than to the presser-side cam surface.

According to this example embodiment of the present invention having the above-described configuration, the recessed portion is located closer to the presser-side assist cam surface than to the presser-side cam surface. With this configuration, the clutch oil flowing to the outside of the center cylindrical portion is effectively supplied also to the presser-side assist cam surface, and therefore, may alleviate abrasion of the presser-side assist cam surface and the center-side assist cam surface.

According to another example embodiment of the present invention, the recessed portion is located closer to the presser-side slipper cam surface than to the presser-side assist cam surface.

According to this example embodiment of the present invention having the above-described configuration, the recessed portion is located closer to the presser-side slipper cam surface than to the presser-side assist cam surface. The stress applied to the presser-side slipper cam surface is smaller than the stress applied to the presser-side assist cam surface. Therefore, the recessed portion is provided closer to the presser-side slipper cam surface, so that the clutch oil may be caused to flow to the outside of the center cylindrical portion while the strength of the center cylindrical portion is kept sufficiently high.

According to another example embodiment of the present invention, the recessed portion is provided in an entirety of a region of the center cylindrical portion extending from at least a central portion in an axial direction thereof to an end thereof on the side of the clutch center.

According to this example embodiment of the present invention having the above-described configuration, the clutch oil flowing out of the flow-out portion of the driven shaft may be caused to flow to the outside of the center cylindrical portion more certainly, and thus a larger amount of the clutch oil may be supplied to the input-side rotating plate and the output-side rotating plate.

According to another example embodiment of the present invention, the center cylindrical portion includes an opening defined by a cut-off portion in the circumferential direction.

According to this example embodiment of the present invention having the above-described configuration, the clutch oil in the center cylindrical portion may be effectively guided to the outside of the center cylindrical portion via the opening.

According to another example embodiment of the present invention, the clutch center includes a plurality of center-side cam portions located diametrically outward of the driven shaft coupling portion, the plurality of center-side cam portions each including a center-side assist cam surface to generate a force applicable in a direction to cause the plate presser to approach the clutch center, in order to increase a pressing force between the input-side rotating plate and the output-side rotating plate, when the clutch center rotates with respect to the plate presser, and also including a center-side slipper cam surface to separate the plate presser from the clutch center, in order to decrease the pressing force between the input-side rotating plate and the output-side rotating plate, when the clutch center rotates with respect to the plate presser, the plate presser includes a plurality of presser-side cam portions located diametrically outward of the center cylindrical portion, the plurality of presser-side cam portions each including a presser-side assist cam surface contactable with the center-side assist cam surface and generating a force in such a direction as to cause the plate presser to approach the clutch center, in order to increase the pressing force between the input-side rotating plate and the output-side rotating plate, when the plate presser rotates with respect to the clutch center, and also including a presser-side slipper cam surface contactable with the center-side slipper cam surface and to separate the plate presser from the clutch center, in order to decrease the pressing force between the input-side rotating plate and the output-side rotating plate, when the plate presser rotates with respect to the clutch center, and the opening is located between two of the presser-side cam portions adjacent to each other in the circumferential direction.

According to this example embodiment of the present invention having the above-described configuration, the opening is located between two of the presser-side cam portions adjacent to each other in the circumferential direction. With this configuration, the clutch oil flowing to the outside of the center cylindrical portion via the opening flows to the input-side rotating plate and the output-side rotating plate more easily.

According to this example embodiment of the present invention having the above-described configuration, the opening is located closer to the presser-side assist cam surface. With this configuration, the clutch oil flowing to the outside of the center cylindrical portion is effectively supplied also to the presser-side assist cam surface, and therefore, may alleviate abrasion of the presser-side assist cam surface and the center-side assist cam surface.

According to another example embodiment of the present invention, the opening is located closer to the presser-side slipper cam surface.

According to this example embodiment of the present invention having the above-described configuration, the opening is located closer to the presser-side slipper cam surface. The stress applied to the presser-side slipper cam surface is smaller than the stress applied to the presser-side assist cam surface. Therefore, the recessed portion is provided closer to the presser-side slipper cam surface, so that the clutch oil may be caused to flow to the outside of the center cylindrical portion while the strength of the center cylindrical portion is kept sufficiently high.

According to another example embodiment of the present invention, regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, and in a case where, regarding the circumferential direction, a direction from one of the two presser-side cam portions toward the other presser-side cam portion is a first circumferential direction and a direction from the other presser-side cam portion toward the one presser-side cam portion is a second circumferential direction, the opening extends from an end of the presser-side assist cam surface on the side of the first circumferential direction to an end of the presser-side slipper cam surface on the side of the second circumferential direction.

According to this example embodiment of the present invention having the above-described configuration, a larger amount of the clutch oil flows to the outside via the opening. Therefore, a larger amount of the clutch oil may be supplied to the input-side rotating plate and the output-side rotating plate.

According to another example embodiment of the present invention, where a direction in which the plate presser approaches the clutch center is a first direction and a direction in which the plate presser moves away from the clutch center is a second direction, an end of the opening on the side of the second direction is located ahead, in the second direction, of an end of the presser-side slipper cam surface on the side of the second direction.

According to this example embodiment of the present invention having the above-described configuration, the opening includes the first portion having the first length in the circumferential direction and the second portion having the second length in the circumferential direction. With this configuration, a larger amount of the clutch oil may be guided from the opening to the outside of the center cylindrical portion.

According to another example embodiment of the present invention, a motorcycle includes a clutch device according to one of the example embodiments of the present invention described herein.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
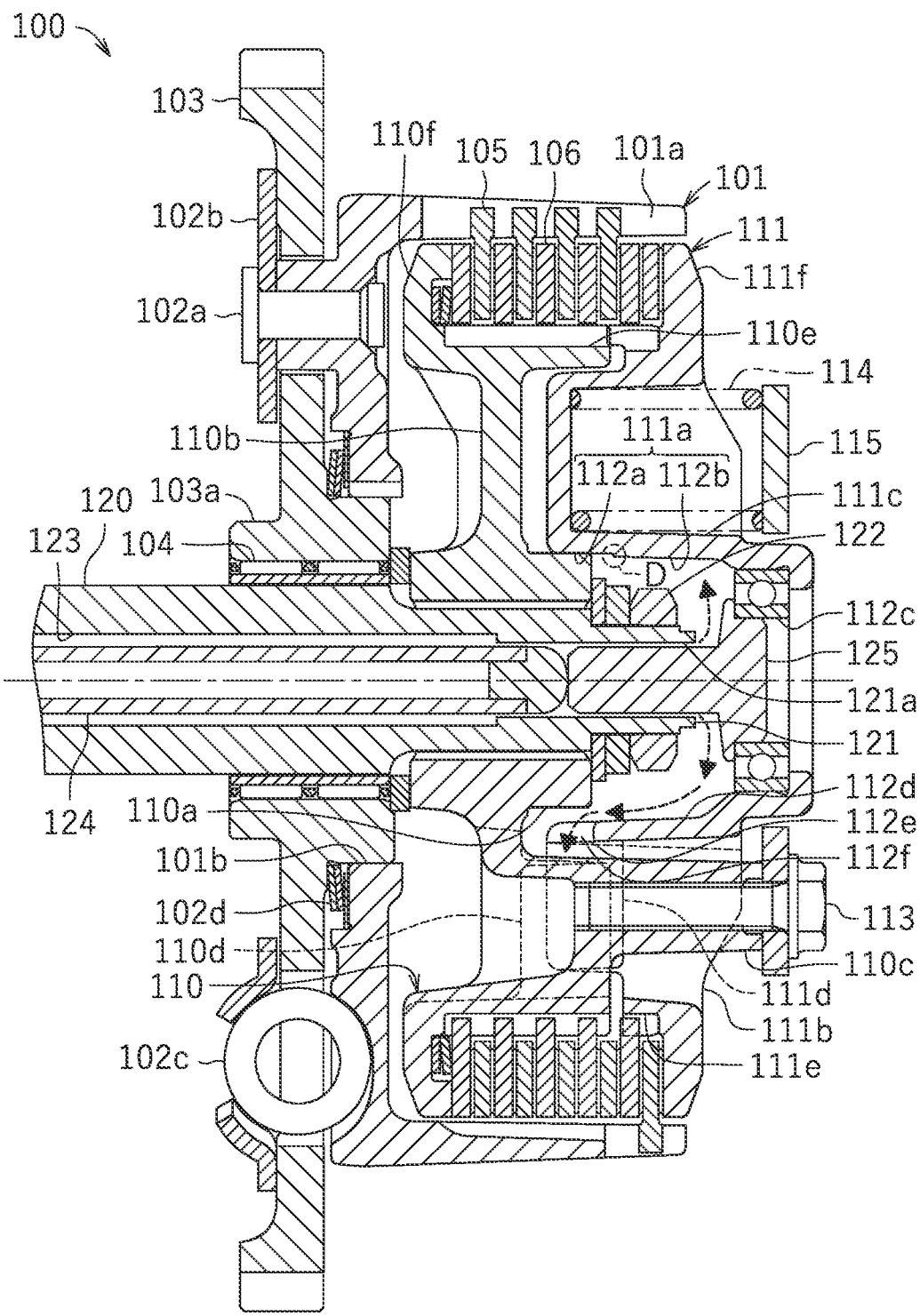
FIG. 1 is a cross-sectional view generally showing an overall configuration in a clutch-ON state of a clutch device according to an example embodiment of the present invention.

Hereinafter, example embodiments of clutch devices according to example embodiments of the present invention will be described with reference to the drawings. FIG. 1 is a cross-sectional view generally showing an overall configuration of a clutch device 100 according to an example embodiment of the present invention. The clutch device 100 is a mechanical device allowing or blocking transfer of a driving force of an engine (not shown), which is a prime mover of a motorbike (motorbike), to a wheel (not shown), which is a driven body, and is located between the engine and a transmission (not shown).

The clutch device 100 includes a clutch outer 101. The clutch outer 101 is a component holding input-side rotating plates 105 and transferring a driving force of the engine to the input-side rotating plates 105, and is formed of an aluminum alloy material molded into a bottomed cylindrical shape. More specifically, a cylindrical portion of the clutch outer 101 includes a rotating plate holder 101a formed therein, and the rotating plate holder 101a includes an internal gear-shaped spline. A plurality of (five in this example embodiment) input-side rotating plates 105 are spline-fitted to, and thus held by, the rotating plate holder 101a in a state where the input-side rotating plates 105 are displaceable in an axial direction of the clutch outer 101 and are rotatable integrally with the clutch outer 101.

The clutch outer 101 includes a coupling hole 101b in a central portion of a left side surface (in the figure) thereof. A boss 103a of an input rotating body 103 described below is attached to the coupling hole 101b in a state where the boss 103a is slidably fitted to the coupling hole 101b. In this case, the input rotating body 103 is attached to the clutch outer 101 via a rivet 102a, a side plate 102b, a torque damper 102c and a separation spring 102d.

The rivet 102a includes a plurality of pin-shaped components restricting displacement of the input rotating body 103 in an axial direction thereof and locating the side plate 102b on a plate surface of the input rotating body 103. The side plate 102b is a flat ring-shaped component to locate the torque damper 102c on the plate surface of the input rotating body 103. The torque damper 102c includes a plurality of coil springs elastically pressing the clutch outer 101 onto the input rotating body 103 in a circumferential direction thereof. The separation spring 102d is a flat ring-shaped spring pressing the input rotating body 103 in a direction in which the input rotating body 103 is separated away from the clutch outer 101. With these components, the input rotating body 103 is attached to the clutch outer 101 so as to be swingable in the circumferential direction.

The input rotating body 103 is a metal gear component rotationally drivable in a state of meshing with a driving gear coupled with a drive shaft (not shown) such as, for example, a crank shaft that rotates by being driven by the prime mover such as the engine or the like. The boss 103a formed in the central portion of the input rotating body 103 is rotatably supported by a shaft 120 via a needle bearing 104. That is, the clutch outer 101 is rotationally drivable integrally with the input rotating body 103 concentrically with the shaft 120 but independently from the shaft 120. The shaft 120 is an example of a driven shaft.

The input-side rotating plates 105 are flat ring-shaped components that are pressed onto the output-side rotating plates 106, and are formed of a thin aluminum plate molded into a ring shape. In this case, an external gear meshing with the internal gear-shaped spline of the clutch outer 101 is formed at an outer circumferential portion of each of the input-side rotating plates 105. Both of side surfaces (front and rear surfaces) of each of the input-side rotating plates 105 each have friction members (not shown), formed of a plurality of paper sheets, attached thereon, and oil grooves (not shown) are formed between the friction members.

The output-side rotating plates 106 are flat ring-shaped components that are pressed onto the input-side rotating plates 105 described above, and are formed of a thin SPCC (steel plate cold commercial) plate punched into a ring shape. The output-side rotating plates 106 (five plates in this example embodiment) are held by a clutch center 110 and a plate presser 111 in a state of being located alternately with the plurality of input-side rotating plates 105 inside the clutch outer 101. Both of side surfaces (front and rear surfaces) of each of the output-side rotating plates 106 each have oil grooves (not shown) having a depth of several micrometers to several tens of micrometers, for example, formed to hold clutch oil, and are subjected to a surface hardening treatment to enhance abrasion resistance thereof.

An internal gear-shaped spline is formed at an inner circumferential portion of each of the output-side rotating plates 106. The internal gear-shaped spline is spline-fitted to a plate holder 110e formed in the clutch center 110 and also to a plate sub holder 111e formed in the plate presser 111. The friction members, which are provided on each of the input-side rotating plates 105, may be provided on each of the output-side rotating plates 106 instead of on each of the input-side rotating plates 105.

The clutch center 110 is a component housing the input-side rotating plates 105 and also the output-side rotating plates 106 and transferring the driving force of the engine toward the transmission, and is formed of an aluminum alloy material molded into a generally cylindrical shape. More specifically, the clutch center 110 mainly includes a driven shaft coupling portion 110a, a ring-shaped intermediate portion 110b and the plate holder 110e integrally formed together.

The driven shaft coupling portion 110a is a portion fitted to an inner surface of the plate presser 111 and coupled with the shaft 120, and extends in an axial direction of the clutch center 110 in a central portion of the clutch center 110. The driven shaft coupling portion 110a is formed to be cylindrical. An outer circumferential surface of the driven shaft coupling portion 110a is formed to be a smooth cylindrical surface on which a center fitting portion 112a of the plate presser 111 is slidable in the axial direction and a circumferential direction of the clutch center 110. An inner circumferential surface of the driven shaft coupling portion 110a includes an internal gear-shaped spline formed in the axial direction thereof, and the shaft 120 is spline-fitted to the spline. That is, the clutch center 110 is rotatable integrally with the shaft 120 concentrically with the clutch outer 101 and the shaft 120.

The ring-shaped intermediate portion 110b is a flange-shaped portion formed between the driven shaft coupling portion 110a and the plate holder 111e. Three cylindrical supports 110c are formed on the ring-shaped intermediate portion 110b, along the circumferential direction. The three cylindrical supports 110c are cylindrical portions each extending like a column in the axial direction of the clutch center 110 to support the plate presser 111. The cylindrical supports 110c each have a female screw formed in an inner circumferential portion thereof. These three cylindrical supports 110c are formed at an equal interval along the circumferential direction of the clutch center 110.

The ring-shaped intermediate portion 110b includes a plurality of trapezoidal center-side cam portions 110d formed therein. The center-side cam portions 110d each have a cam surface formed of a slope acting as an Assist & Slipper (registered trademark) mechanism. The Assist &

Slipper mechanism generates an assist torque as a force increasing a contact pressure force between the input-side rotating plates 105 and the output-side rotating plates 106 or a slipper torque as a force to separate the input-side rotating plates 105 and the output-side rotating plates 106 from each other on an early stage and shifting these plates into a half-clutch state. In this example embodiment, the clutch center 110 includes three center-side cam portions 110d. The number of the center-side cam portions 110d is not limited to three. The Assist & Slipper (registered trademark) mechanism may be omitted to form the ring-shaped intermediate portion 110b.

Figure 7:
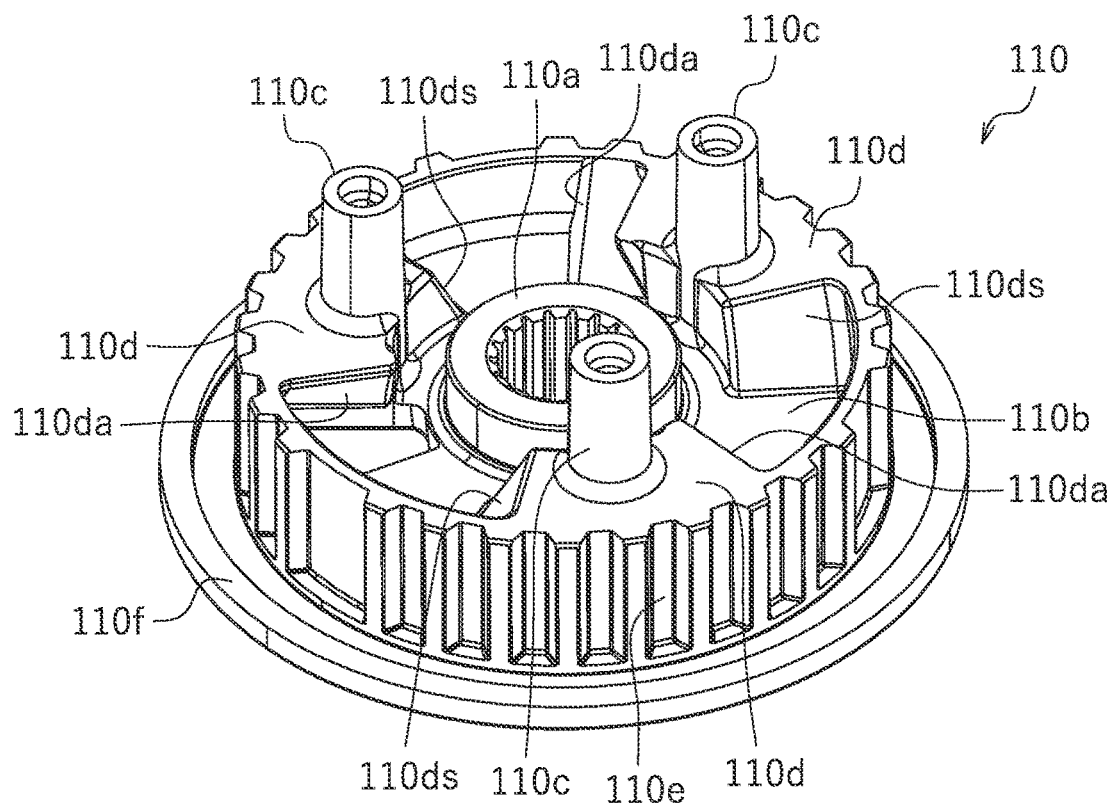
FIG. 7 is a perspective view showing a configuration of a clutch center shown in FIG. 1.

As shown in FIG. 7, the center-side cam portions 110d are located diametrically outward of the driven shaft coupling portion 110a. The center-side cam portions 110d are located in the circumferential direction of the clutch center 110 at an equal interval. The center-side cam portions 110d each have a center-side assist cam surface 110da and a center-side slipper cam surface 110ds. The center-side assist cam surface 110da is configured to generate a force in such a direction as to cause the plate presser 111 to approach the clutch center 110, in order to increase a pressing force (contact pressure force) between the input-side rotating plates 105 and the output-side rotating plates 106, when the clutch center 110 rotates with respect to the plate presser 111. In this example embodiment, when this force is generated, the position of the plate presser 111 with respect to the clutch center 110 does not change, and the plate presser 111 does not need to approach the clutch center 110 physically. The plate presser 111 may be physically displaced with respect to the clutch center 110. A direction in which the plate presser 111 approaches the clutch center 110 will be referred to as a first direction D1 (see FIG. 9). The center-side slipper cam surface 110ds is configured to separate the plate presser 111 from the clutch center 110, in order to decrease the pressing force (contact pressure force) between the input-side rotating plates 105 and the output-side rotating plates 106, when the clutch center 110 rotates with respect to the plate presser 111. A direction in which the plate presser 111 moves away from the clutch center 110 will be referred to as a second direction D2 (see FIG. 9). Regarding two of the center-side cam portions 110d adjacent to each other in the circumferential direction, the center-side assist cam surface 110da of one center-side cam portion 110d and the center-side slipper cam surface 110ds of the other center-side cam portion 110d are opposed to each other in the circumferential direction.

The plate holder 110e is a portion holding a portion of the plurality of output-side rotating plates 106 together with the input-side rotating plates 105, and extends in the axial direction of the clutch center 110 in an outer edge of the clutch center 110. The plate holder 110e is cylindrical. The plate holder 110e includes an outer circumferential portion formed of an external gear-shaped spline, and holds the output-side rotating plates 106 and the input-side rotating plates 105 located alternately in a state where the output-side rotating plates 106 and the input-side rotating plates 105 are displaceable in the axial direction of the clutch center 110 and are rotatable integrally with the clutch center 110.

The plate holder 110e includes a plate receiver 110f formed in a left tip portion (in the figure) thereof. The plate receiver 110f is a portion receiving the output-side rotating plates 106 and the input-side rotating plates 105 pressed by the plate presser 111 and sandwiching the output-side rotating plates 106 and the input-side rotating plates 105 together with the plate presser 111. The plate receiver 110f includes a tip portion of the cylindrical plate holder 110e protruding like a flange diametrically outward.

Figure 2:
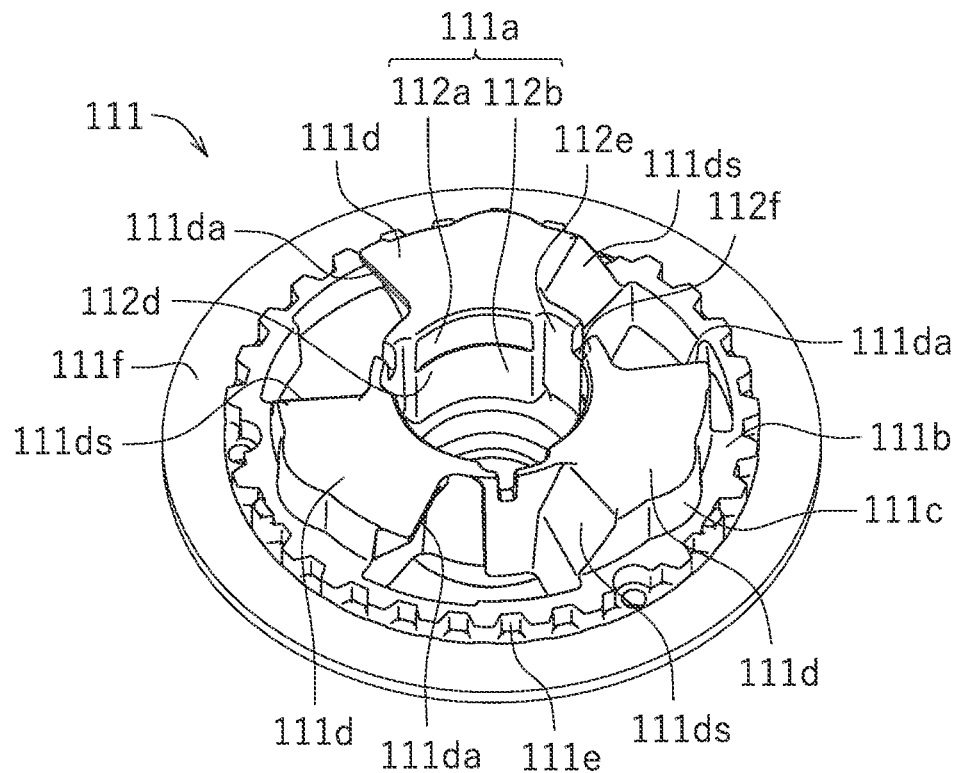
FIG. 2 is a perspective view showing a configuration of the side of a center fitting portion of a plate presser shown in FIG. 1.

The plate presser 111 is a component pressing the input-side rotating plates 105 to put the input-side rotating plates 105 and the output-side rotating plates 106 into close contact with each other, and is formed of an aluminum alloy material molded into a generally discus shape having an outer diameter substantially the same as an outer diameter of the output-side rotating plates 106. More specifically, as shown in FIG. 2, the plate presser 111 mainly includes a center cylindrical portion 111a, a ring-shaped intermediate portion 111b and the plate sub holder 111e integrally formed together.

The center cylindrical portion 111a is a portion that is slidably fitted to an outer surface of the driven shaft coupling portion 110a and receives a pressing force from a push rod 124 included in the shaft 120, and is cylindrical. The center cylindrical portion 111a houses a tip portion 121 of the shaft 120. The center cylindrical portion 111a includes the center fitting portion 112a and an oil receiver 112b formed therein.

The center fitting portion 112a is a portion fitted to the outer surface of the driven shaft coupling portion 110a of the clutch center 110 so as to be slidable an axial direction and a circumferential direction of the driven shaft coupling portion 110a, and is formed to have a cylindrical shape having a constant inner diameter. In this case, the inner diameter of the center fitting portion 112a has a meshing tolerance with which the clutch oil flowing out of the tip portion of the shaft 120 is allowed to be distributed through a region between the center fitting portion 112a and the driven shaft coupling portion 110a. In this example embodiment, the inner diameter of the center fitting portion 112a is larger by about 0.1 mm, for example, than an outer diameter of the driven shaft coupling portion 110a. The size tolerance between the inner diameter of the center fitting portion 112a and the outer diameter of the driven shaft coupling portion 110a is set appropriately in accordance with the amount of the clutch oil to be distributed. The size tolerance is preferably about 0.1 mm or longer and about 0.5 mm or shorter, for example.

The oil receiver 112b is a portion receiving the pressing force from the push rod 124 included in the shaft 120 and also receiving the clutch oil flowing out of the tip portion of the shaft 120, and is formed to have a cylindrical shape having an inner diameter shorter than that of the center fitting portion 112a. A release bearing 112c is fitted to a right end portion (in the figure) of the oil receiver 112b, and a slope 112d is formed between the portion to which the release bearing 112c is fitted and the center fitting portion 112a.

The slope 112d is a portion guiding the clutch oil flowing out of the tip portion 121 of the shaft 120 toward the center fitting portion 112a, and expands diametrically outward such that the slope 112d descends from the portion to which the release bearing 112c is fitted, toward the center fitting portion 112a. In this case, the angle of the slope 112d is set appropriately in accordance with the amount of the clutch oil to be guided toward the center fitting portion 112a. The angle of the slope 112d is preferably about 1 degrees or larger and about 5 degrees or smaller, for example. The slope 112d is formed at the entirety of a region between the portion to which the release bearing 112c is fitted and the center fitting portion 112a. The center fitting portion 112a and the oil receiver 112b include oil path expansion portions 112e formed therein. The oil path expansion portions 112e are provided in the center cylindrical portion 111a so as to expand diametrically outward. The oil path expansion portions 112e expand diametrically outward in a portion in the circumferential direction in which the center fitting portion 112a is formed. The oil path expansion portions 112e are each an example of a recessed portion.

Figure 8:
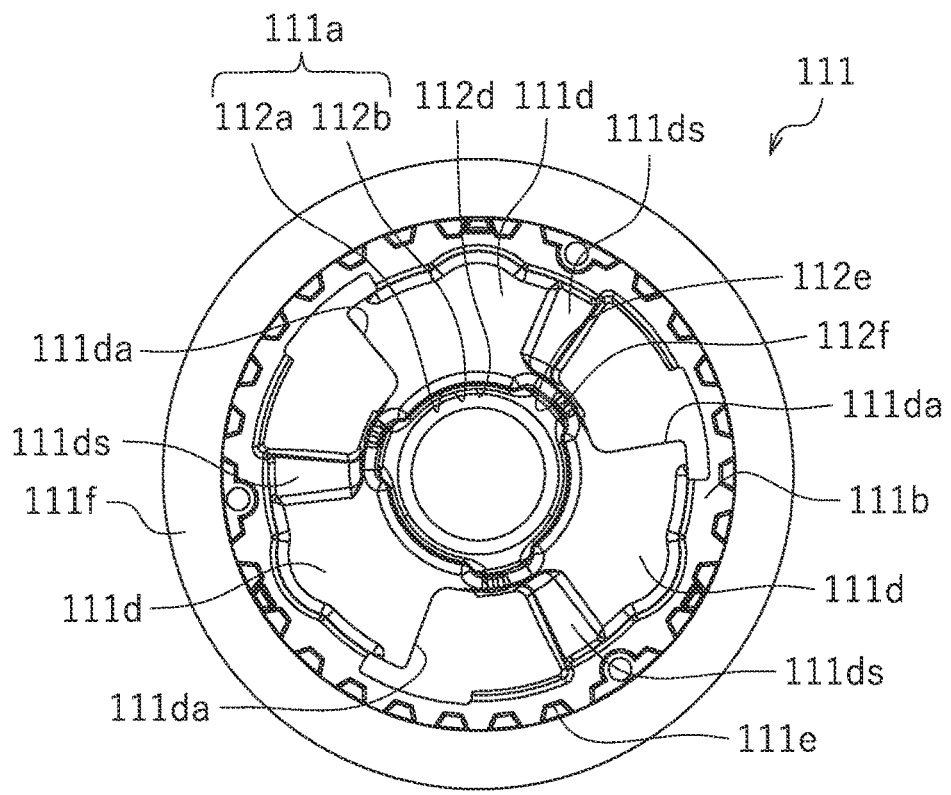
FIG. 8 is a plan view showing a configuration on the side of the center fitting portion of the plate presser shown in FIG. 1.
Figure 9:
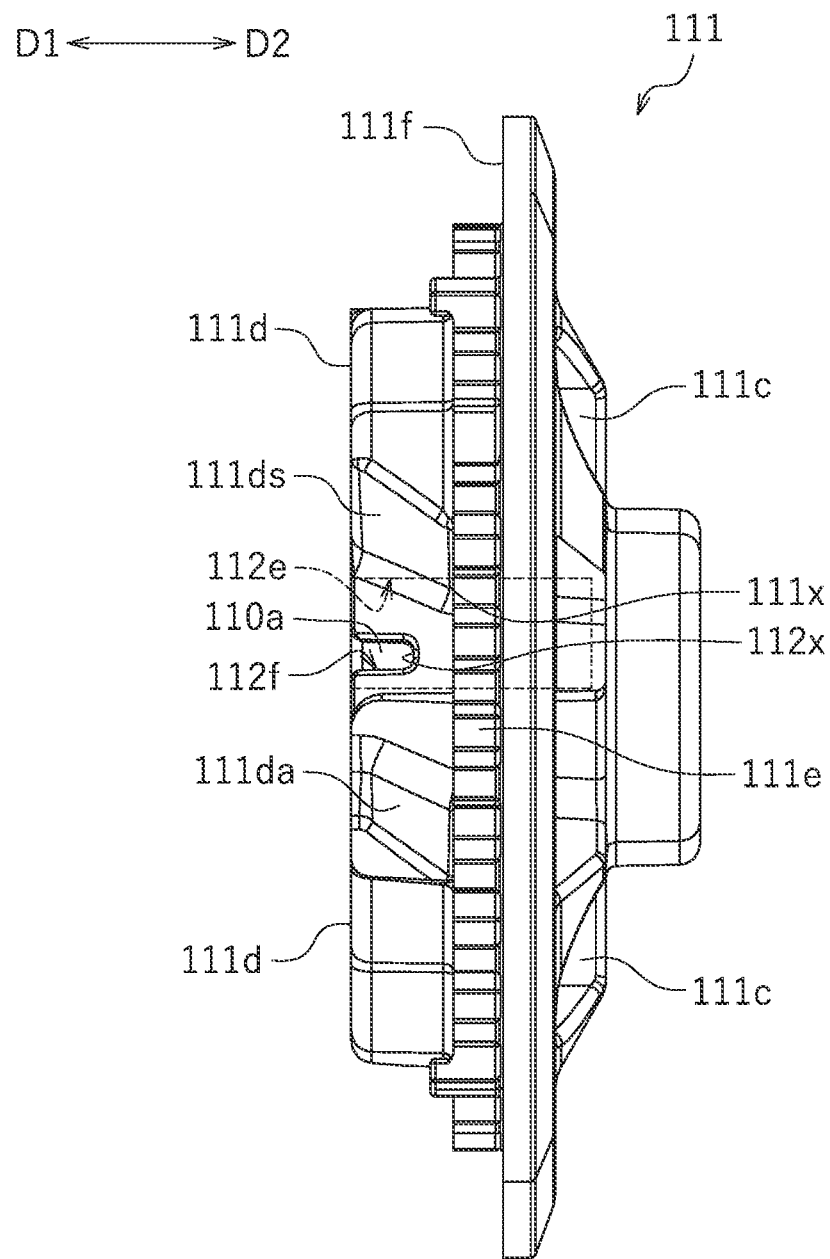
FIG. 9 is a side view showing a configuration of the plate presser shown in FIG. 1

The clutch oil flowing out of a flow-out portion 121a of the shaft 120 flows into the oil path expansion portions 112e. The oil path expansion portions 112e are each a portion actively causing the clutch oil present in the oil receiver 112b to the outside of the oil receiver 112b, and are each formed to have a groove-like shape protruding diametrically outward from inner circumferential surfaces of the center fitting portion 112a and the oil receiver 112b. In this case, three oil path expansion portions 112e are formed at an equal interval along a circumferential direction of the oil receiver 112b. As shown in FIG. 8, the oil path expansion portions 112e are each located between two presser-side cam portions 111d adjacent to each other in the circumferential direction. As shown in FIG. 9, the oil path expansion portions 112e are each located closer to a presser-side slipper cam surface 111ds. With this configuration, the clutch oil flowing to the outside of the center cylindrical portion 111a via the oil path expansion portions 112e is effectively supplied also to the presser-side slipper cam surfaces 111ds.

The three oil path expansion portions 112e are formed in the entirety of a region in the center cylindrical portion 111a from at least a central portion in an axial direction thereof to an end thereof on the clutch center 110 side. In this example embodiment, the oil path expansion portions 112e extend from an end, on the slope 112d side, of the portion to which the release bearing 112c is fitted, to a tip portion (left end in the figure) of the center fitting portion 112a. That is, the oil path expansion portions 112e are each formed like a groove extending continuously along the slope 112d and the center fitting portion 112a. The oil path expansion portions 112e expand diametrically outward so as to have a slope descending from the portion to which the release bearing 112c is fitted, toward the center fitting portion 112a.

A gap is formed between each of the oil path expansion portions 112e and an outer circumferential portion of the driven shaft coupling portion 110a. The size of the gap is set appropriately in accordance with the amount of the clutch oil to be distributed. The size of the gap is preferably at least 10 times the size tolerance between the inner diameter of the center fitting portion 112a and the outer diameter of the driven shaft coupling portion 110a, and more preferably at least 100 times the size tolerance, for example. The oil path expansion portions 112e each include an opening 112f formed therein. Regarding the length (groove width) of the oil path expansion portions 112e in a circumferential direction of the center cylindrical portion 111a, it is preferred that a sum of the groove widths of the three oil path expansion portions 112e is at most a half of the length of the center cylindrical portion 111a in the circumferential direction.

The openings 112f are each a portion actively causing the clutch oil present in the oil receiver 112b to the outside of the oil receiver 112b. The openings 112f are each formed by a portion of the center portion cylindrical 111a in the circumferential direction being partially cut off. In this example embodiment, the openings 112f are each formed by a portion of the corresponding oil path expansion portion 112e being cut off. As shown in FIG. 9, each opening 112f is located between two of the presser-side cam portions 111d adjacent to each other in the circumferential direction. The opening 112f is located closer to the presser-side slipper cam surface 111d. With this configuration, the clutch oil flowing out to the outside of the center cylindrical portion 111a via the openings 112f is effectively supplied also to the presser-side slipper cam surfaces 111ds. In this case, the openings 112f extend from the tip portion (left end in FIG. 1) of the center fitting portion 112a to a position overlapping the oil receiver 112b in the circumferential direction. An end 112x of each opening 112f on the second direction D2 side is located ahead, in the first direction D1, of an end 111x of the corresponding presser-side slipper cam surface 111ds on the second direction D2 side. Each opening 112f has a width that is at most a half of the groove width of the corresponding oil path expansion portion 112e. The end 112x of each opening 112f on the second direction D2 side is U-shaped or substantially U-shaped.

The ring-shaped intermediate portion 111b is a flange-shaped portion formed between the center cylindrical portion 111a and the plate sub holder 111e. The ring-shaped intermediate portion 111b includes three cylindrical housings 111c along the circumferential direction. The cylindrical housings 111c are each formed in the corresponding presser-side cam portion 111d having the Assist & Slipper (registered trademark) mechanism described above.

The three cylindrical housings 111c are portions respectively housing clutch springs 114 described below, and are circular. More specifically, the three cylindrical housings 111c are recessed at an equal interval along a circumferential direction of the plate presser 111. The clutch springs 114 are respectively housed in the recessed cylindrical housings 111c. In this case, the above-described three cylindrical supports 110c are located between the three cylindrical housings 111c in the circumferential direction in a state where the cylindrical supports 110c run through the plate presser 111. The presser-side cam portions 111d are each formed to have a trapezoidal shape having a cam surface formed of a slope acting as an Assist & Slipper (registered trademark) mechanism. The Assist & Slipper mechanism slides on the corresponding center-side cam portion 110d to generate an assist torque or a slipper torque. In this example embodiment, the plate presser 111 includes three presser-side cam portions 111d. The number of the presser-side cam portions 111d is not limited to three.

As shown in FIG. 8, the presser-side cam portions 111d are located diametrically outward of the center cylindrical portion 111a. The presser-side cam portions 111d are located at an equal interval along the circumferential direction of the plate presser 111. The presser-side cam portions 111d each include a presser-side assist cam surface 111da and a presser-side slipper cam surface 111ds. The presser-side assist cam surfaces 111da are each contactable with the corresponding center-side assist cam surface 110da. The presser-side assist cam surfaces 111da are each configured to generate a force in such a direction as to cause the plate presser 111 to approach the clutch center 110, in order to increase a pressing force (contact pressure force) between the input-side rotating plates 105 and the output-side rotating plates 106, when the plate presser 111 rotates with respect to the clutch center 110. The presser-side slipper cam surfaces 111ds are each contactable with the corresponding center-side slipper cam surface 110ds. The presser-side slipper cam surfaces 111ds are each configured to separate the plate presser 111 from the clutch center 110, in order to decrease the pressing force (contact pressure force) between the input-side rotating plates 105 and the output-side rotating plates 106, when the plate presser 111 rotates with respect to the clutch center 110. Regarding two of the presser-side cam portions 111d adjacent to each other in the circumferential direction, the presser-side assist cam surface 111da of one presser-side cam portion 111d and the presser-side slipper cam surface 111ds of the other presser-side cam portion 111d are opposed to each other in the circumferential direction.

The plate sub holder 111e is a portion holding another portion of the plurality of output-side rotating plates 106 together with the input-side rotating plates 105, and has a cylindrical shape extending in an axial direction of the plate presser 111 in an outer edge of the plate presser 111. The plate sub holder 111e includes an outer circumferential portion formed of an external gear-shaped spline, and holds the output-side rotating plates 106 and the input-side rotating plates 105 located alternately in a state where the output-side rotating plates 106 and the input-side rotating plates 105 are displaceable in the axial direction of the plate presser 111 and are rotatable integrally with the plate presser 111. The plate sub holder 111e includes a plate pressing portion 111f formed in a tip portion thereof.

The plate pressing portion 111f is a portion pressing the output-side rotating plates 106 and the input-side rotating plates 105 held by the plate sub holder 111e toward the plate receiver 110f to put the output-side rotating plates 106 and the input-side rotating plates 105 into close contact with each other. The plate pressing portion 111f is formed of a base portion, of the cylindrical plate sub holder 111e, protruding like a flange diametrically outward.

The plate presser 111 is attached to the clutch center 110 by three attachment bolts 113. Specifically, the clutch springs 114 are respectively housed in the three cylindrical housings 111c, and the cylindrical supports 110c run through the plate presser 111 between the three cylindrical housings 111c in the circumferential direction. In this state, the attachment bolts 113 are tightened to the cylindrical supports 110c via stopper members 115. Thus, the plate presser 111 is secured to the clutch center 110.

In this case, the clutch springs 114 are each an elastic body, having an elastic force, that is located in the corresponding cylindrical housing 111c and presses the plate presser 111 onto the clutch center 110, and are each include a coil spring of spring steel wound spirally. The stopper members 115 are each a metal component restricting the amount by which the plate presser 111 is displaced in a direction of moving away from the clutch center 110, and are each formed to be generally triangular as seen in a plan view. With this configuration, the plate presser 111 is attached to the clutch center 110 in a state of being displaceable in a direction toward or away from the clutch center 110.

The shaft 120 is a component transferring a rotation driving force of the clutch center 110 to a driven body (not shown) such as a wheel or the like, and is formed of a steel material shaped into a hollow cylinder. The tip portion 121 at one end (right end in the figure) of the shaft 120 supports the input rotating body 103 via the needle bearing 104 such that the input rotating body 103 is rotatable, and the clutch center 110 is spline-fitted to the shaft 120. In this case, a nut 122 is fitted, by a screw, to the tip portion at the right end (in the figure) of the shaft 120 to prevent the clutch center 110 from being pulled off from the shaft 120.

That is, the clutch center 110 is rotatable integrally with the shaft 120. By contrast, the other end (not shown) of the shaft 120 is coupled with the transmission (not shown) of the motorcycle. That is, the shaft 120 corresponds to the driven shaft. A hollow portion 123 formed of a through-hole extending in an axial direction thereof is formed in the shaft 120.

The hollow portion 123 acts as a flow path of the clutch oil to be supplied into the clutch device 100, and is provided with the push rod 124. The clutch oil flows in the shaft 120, that is, the hollow portion 123. One end (left end in the figure) of the push rod 124 of the shaft 120 is coupled with a clutch release mechanism (not shown), and the other end (right end in the figure) of the push rod 124 presses a push member 125. The push rod 124 is formed to have a diameter shorter than an inner diameter of the hollow portion 123, and thus the flowability of the clutch oil in the hollow portion 123 is guaranteed.

The clutch release mechanism is a mechanical device pressing the push rod 124 onto the release bearing 112c by an operation on a clutch operation lever (not shown) performed by a driver of a self-propelled vehicle having the clutch device 100 mounted thereon.

The push member 125 is a component pressing the plate presser 111 via the release bearing 112c, and is formed of a metal material shaped into a rod. One end (right end in the figure) of the push member 125 is coupled with the release bearing 112c provided in the plate presser 111, and the other end (left end in the figure) of the push member 125 is slidably fitted to the tip portion 121 of the hollow portion 123 of the shaft 120. In this case, a portion of the push member 125 that is to be fitted to the hollow portion 123 has an outer diameter that is shorter than the inner diameter of the hollow portion 123, and thus the flowability of the clutch oil in the hollow portion 123 is guaranteed. With this configuration, the clutch oil flows out of the flow-out portion 121a in the tip portion 121 of the shaft 120 into the center cylindrical portion 111a of the plate presser 111.

The clutch device 100 is filled with the clutch oil (not shown) of a predetermined amount. The clutch oil is mainly supplied to an inner space, of the clutch device 100, including gaps between the input-side rotating plates 105 and the output-side rotating plates 106, and thus prevents absorption of heat and abrasion of the friction members. That is, the clutch device 100 is a so-called multiplate wet friction clutch device.

Now, an operation of the clutch device 100 having the above-described configuration will be described. As described above, the clutch device 100 is located between the engine and the transmission in the vehicle, and allows or blocks transfer of a rotation driving force of the engine to the transmission by an operation on the clutch operation lever by a driver of the vehicle.

This will be described specifically. In the case where the driver (not shown) of the vehicle does not operate the clutch operation lever, the clutch device 100 operates as follows. The clutch release mechanism (not shown) does not press the push member 125, and thus, the plate presser 111 presses the input-side rotating plates 105 with an elastic force of the clutch springs 114. Accordingly, the clutch center 110 enters a clutch-ON state, in which the input-side rotating plates 105 and the output-side rotating plates 106 are pushed against each other to be friction-coupled, and the clutch center 110 is rotationally driven. That is, the rotation driving force of the prime mover is transferred to the clutch center 110, and the shaft 120 is rotationally driven.

In the clutch-ON state, the clutch oil flowing in the shaft 120 and then flowing out of the flow-out portion 121a in the tip portion 121 of the shaft 120 is dropped or spattered into the oil receiver 112b in the center cylindrical portion 111a and attached to the oil receiver 112b (see dashed arrows in FIG. 1). In this case, the oil receiver 112b includes the slope 112d, which inclines such that the inner diameter of the oil receiver 112b increases toward the center fitting portion 112a, and therefore, actively guides the clutch oil attached thereto toward the center fitting portion 112a.

Accordingly, the clutch oil flows to the outside of the center cylindrical portion 111a through a region between the driven shaft coupling portion 110a and the center fitting portion 112a, and is distributed to various portions in the clutch device 100. In this case, the center cylindrical portion 111a also includes the oil path expansion portions 112e and the openings 112f formed therein. Therefore, the clutch oil attached to the slope 112d more actively flows to the outside of the clutch center cylindrical portion 111a and is distributed to various portions in the clutch device 100.

By contrast, when the driver of the vehicle operates the clutch operation lever in the clutch-ON state, the clutch device 100 operates as follows. The clutch release mechanism (not shown) presses the push member 125, and thus, the plate presser 111 is displaced in a direction away from the clutch center 110 against an elastic force of the clutch springs 114. Accordingly, the clutch center 110 enters a clutch-OFF state, in which the friction coupling between the input-side rotating plates 105 and the output-side rotating plates 106 is canceled, and thus, rotational driving attenuates or stops. That is, the rotation driving force of the prime mover is blocked and is not transferred to the clutch center 110.

In the clutch-OFF state, the clutch oil flowing out of the tip portion 121 of the shaft 120 is actively guided toward the center fitting portion 112a via the slope 112d, in the same manner as in the clutch-ON state. In this case, the plate presser 111 is separated from the clutch center 110, and thus, the amount of fitting between the center fitting portion 112a and the driven shaft coupling portion 110a decreases. This enlarges areas, of the oil path expansion portions 112e and the openings 112f, that are exposed in the center cylindrical portion 111a. Accordingly, the clutch oil in the oil receiver 112b more actively flows to the outside of the center cylindrical portion 111a and is distributed to various portions in the clutch device 100. In particular, the clutch oil may be actively guided to the gaps between the input-side rotating plates 105 and the output-side rotating plates 106 separated from each other.

Then, when the driver releases the clutch operation lever in the clutch-OFF state, the plate presser 111 is released from the state of being pressed by the clutch release mechanism (not shown) through the push member 125, and thus, the plate presser 111 is displaced in a direction toward the clutch center 110 by an elastic force of the clutch springs 114.

As can be understood from the operation described above, in the clutch device 100 according to this example embodiment, the center cylindrical portion 112a of the plate presser 111 is slidably fitted to the outer surface of the driven shaft coupling portion 110a of the clutch center 110, and the slope 112d expanding diametrically outward toward the center fitting portion 112a is formed at the inner circumferential surface of the oil receiver 112b of the plate presser 111, throughout the circumferential direction thereof. Accordingly, the clutch device 100 may effectively guide the clutch oil flowing out of the shaft 120 as the driven shaft, to a sliding portion along which the clutch center 110 and the plate presser 111 slide against each other and then causes the clutch oil to flow to the outside of the sliding portion (outside of the center cylindrical portion 111a). Thus, the clutch oil lubricates the inside of the clutch device 100. That is, in the clutch device 100 according to the present invention, the sliding portion of the clutch center 110 and the plate presser 111 may be provided at the driven shaft coupling portion 110a, which is close to a central portion of the clutch center 110. Thus, the clutch device 100 may make the sliding portion small, and thus may be decreased in size.

The present invention is not limited to being carried out in the above-described example embodiments, and various modifications may be made.

Figure 3:
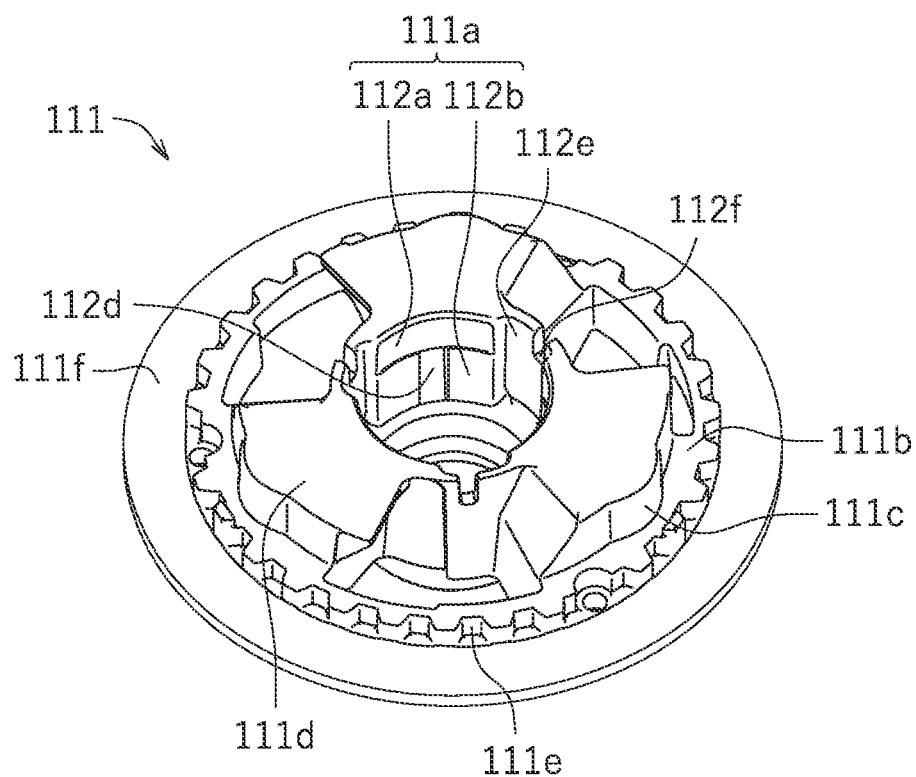
FIG. 3 is a perspective view showing a configuration on the side of the center fitting portion of the plate presser according to a modification of an example embodiment of the present invention.

For example, in the above-described example embodiment, the slope 112d is formed at a region between the portion, of the oil receiver 112b, to which the release bearing 112c is fitted and the center fitting portion 112a, throughout the circumferential direction. However, it is sufficient that the slope 112d is formed at least at a portion of the inner circumferential surface of the oil bearing portion 112b, more specifically, at a slope having an inner diameter expanding toward the center fitting portion 112a. In this case, as shown in FIG. 3, one slope 112d may be formed in the circumferential direction of the oil receiver 112b and in the axial direction. Still alternatively, the slopes 112d may be formed intermittently in the circumferential direction of the oil receiver 112b or in the axial direction.

Figure 4:
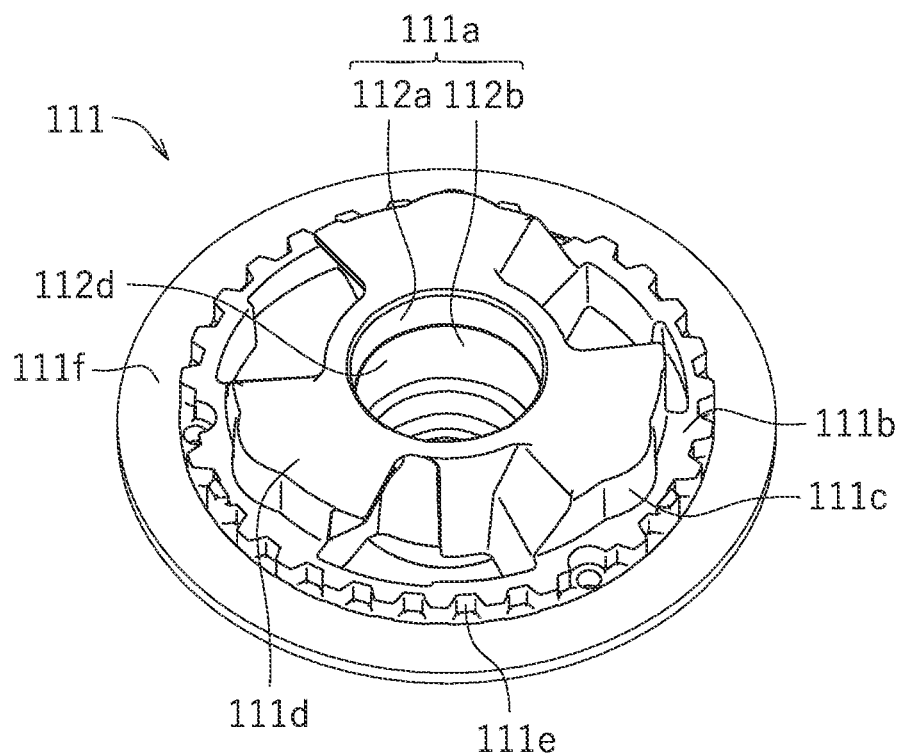
FIG. 4 is a perspective view showing a configuration on the side of the center fitting portion of the plate presser according to another modification of an example embodiment of the present invention.
Figure 5:
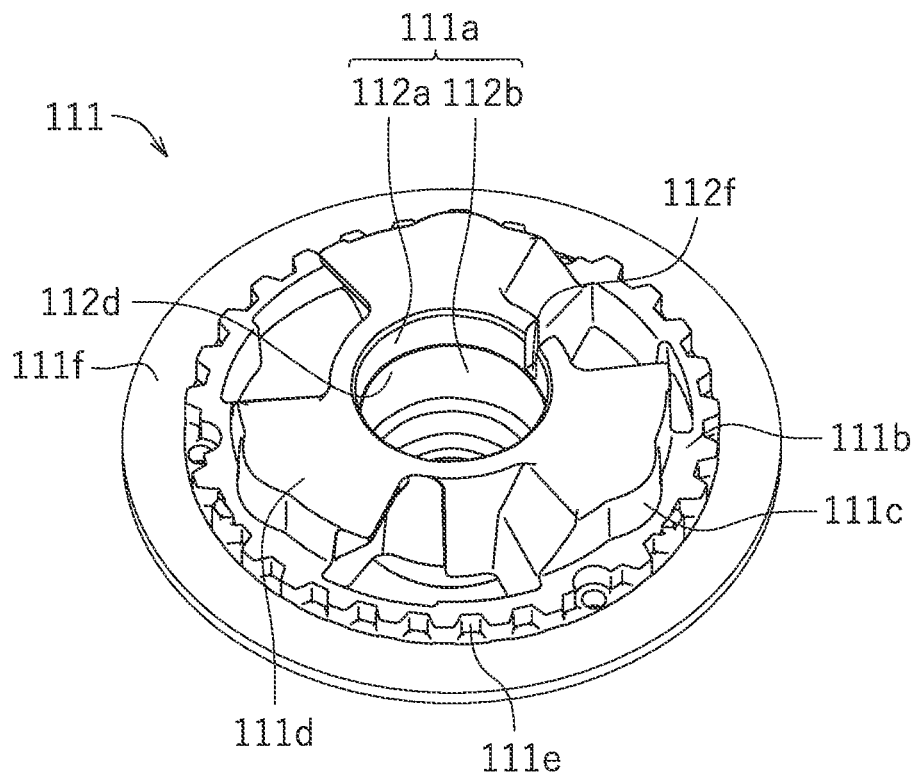
FIG. 5 is a perspective view showing a configuration on the side of the center fitting portion of the plate presser according to still another modification of an example embodiment of the present invention.

In the above-described example embodiment, the center cylindrical portion 111a includes the oil path expansion portions 112e in a portion of the center fitting portion 112a and the oil receiver 112b. With this configuration, the center fitting portion 111a may effectively guide the clutch oil therein to the outside thereof. Alternatively, as shown in each of FIG. 4 and FIG. 5, the oil path expansion portions 112e may be omitted to form the center fitting portion 111a. In the plate presser 111 shown in FIG. 4, the oil path expansion portions 112e and the openings 112f are omitted from the center fitting portion 112a. In the plate presser 111 shown in FIG. 5, only the oil path expansion portions 112e are omitted from the center fitting portion 112a. Still alternatively, the oil path expansion portions 112e may be formed in either one of the center fitting portion 112a or the oil receiver 112b of the center cylindrical portion 111a.

In the case of being formed in the oil receiver 112b, the oil path expansion portions 112e may be formed in the entirety of, or a portion of, the oil receiver 112b in the axial direction of the center cylindrical portion 111a as long as the oil path expansion portions 112e are connected with the center fitting portion 112a. In the case of being formed in the center fitting portion 112a, the oil path expansion portions 112e do not need to be connected with the oil receiver 112b. However, the ease of discharging the clutch oil may be improved in the case where the oil path expansion portions 112e are connected with the oil receiver 112b.

Figure 6:
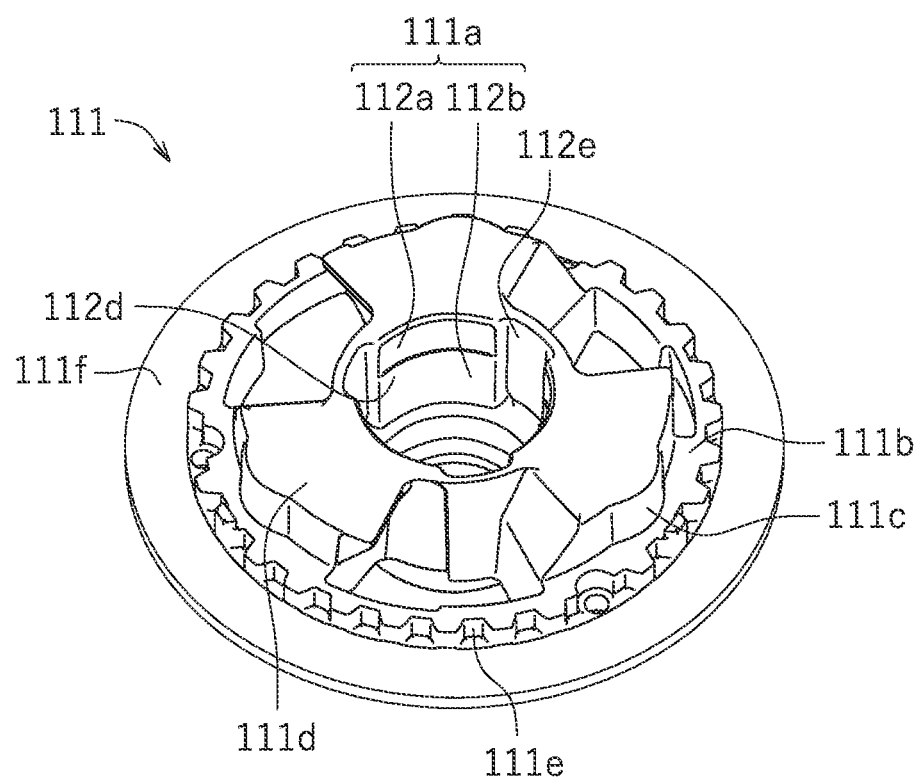
FIG. 6 is a perspective view showing a configuration on the side of the center fitting portion of the plate presser according to still another modification of an example embodiment of the present invention.

In the above-described example embodiments, the center cylindrical portion 111a includes the openings 112f in a portion of the center fitting portion 112a and the oil receiver 112b. With this configuration, the center cylindrical portion 111a may effectively guide the clutch oil therein to the outside thereof. However, as shown in each of FIG. 4 and FIG. 6, the openings 112f may be omitted to form the center cylindrical portion 111a. In the plate presser 111 shown in FIG. 6, only the openings 112f are omitted from the center fitting portion 112a.

The center cylindrical portion 111a may include the openings 112f formed in one of the center fitting portion 112a and the oil receiver 112b. In the case of being formed in the center fitting portion 112a or the oil receiver 112b, the openings 112f may be formed in the entirety of, or a portion of, the center cylindrical portion 111a in the axial direction. In the case of being formed in the center fitting portion 112a, the openings 112f do not need to be connected with the oil receiver 112b. However, the ease of discharging the clutch oil may be improved in the case where the openings 112f are connected with the oil receiver 112b.

In the above-described example embodiment, the openings 112f are formed at positions facing a central portion of the plate holder 110e in an axial direction thereof. With this configuration, the clutch oil in the center cylindrical portion 111a is supplied, via the openings 112f, to the outside of the center cylindrical portion 111a, more specifically, to a central portion, of the plate holder 110e, where the input-side rotating plates 105 and the output-side rotating plates 106 are aligned. Thus, the clutch oil may effectively lubricate the entirety of the input-side rotating plates 105 and the output-side rotating plates 106. The openings 112f may be formed at positions facing a non-central position (position shifted from the central position) of the plate holder 110e in the axial direction thereof.

In the above-described example embodiments, the center fitting portion 112a is formed to expand, in a stepped manner (represented by dashed circle D in FIG. 1), at a border with the oil receiver 112b and then to be cylindrical. With this configuration, the center cylindrical portion 111a may form a clutch oil reservoir at the stepped border between the center fitting portion 112a and the oil receiver 112b, and thus may easily guide the clutch oil to a region between the driven shaft coupling portion 110a and the center fitting portion 112a. Alternatively, the center fitting portion 112a may be formed to be cylindrical without the stepped portion being formed at the border with the oil receiver 112b.

Figure 10:
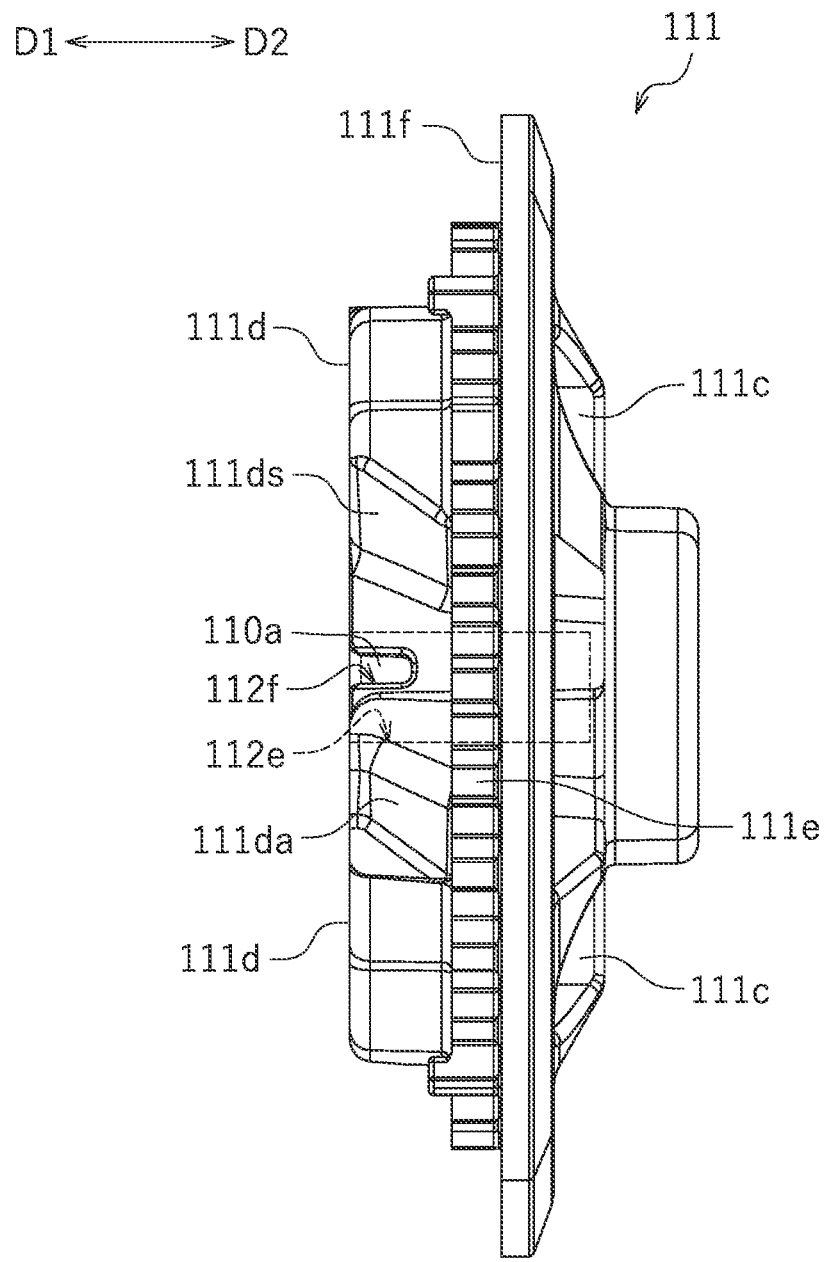
FIG. 10 is a side view showing a configuration of the plate presser according to still another modification of an example embodiment of the present invention.

In the above-described example embodiments, the oil path expansion portions 112e are formed closer to the presser-side slipper cam surfaces 111ds. The oil path expansion portions 112e are not limited to this. For example, as shown in FIG. 10, the oil path expansion portions 112e may be located closer to the presser-side assist cam surfaces 111da. With this configuration, the clutch oil flowing to the outside of the center cylindrical portion 111a via the oil path expansion portions 112e is effectively supplied also to the presser-side assist cam surfaces 111da. The oil path expansion portions 112e may be provided at a middle position between the presser-side slipper cam surfaces 111ds and the presser-side assist cam surfaces 111da in the circumferential direction.

In the above-described example embodiments, the openings 112f are located closer to the presser-side slipper cam surfaces 111ds. The openings 112f are not limited to this. For example, as shown in FIG. 10, the openings 112f may be located closer to the presser-side assist cam surfaces 111da. With this configuration, the clutch oil flowing to the outside of the center cylindrical portion 111a via the openings 112f is effectively supplied also to the presser-side assist cam surfaces 111da. The openings 112f may be provided at a middle position between the presser-side slipper cam surfaces 111ds and the presser-side assist cam surfaces 111da in the circumferential direction.

Figure 11:
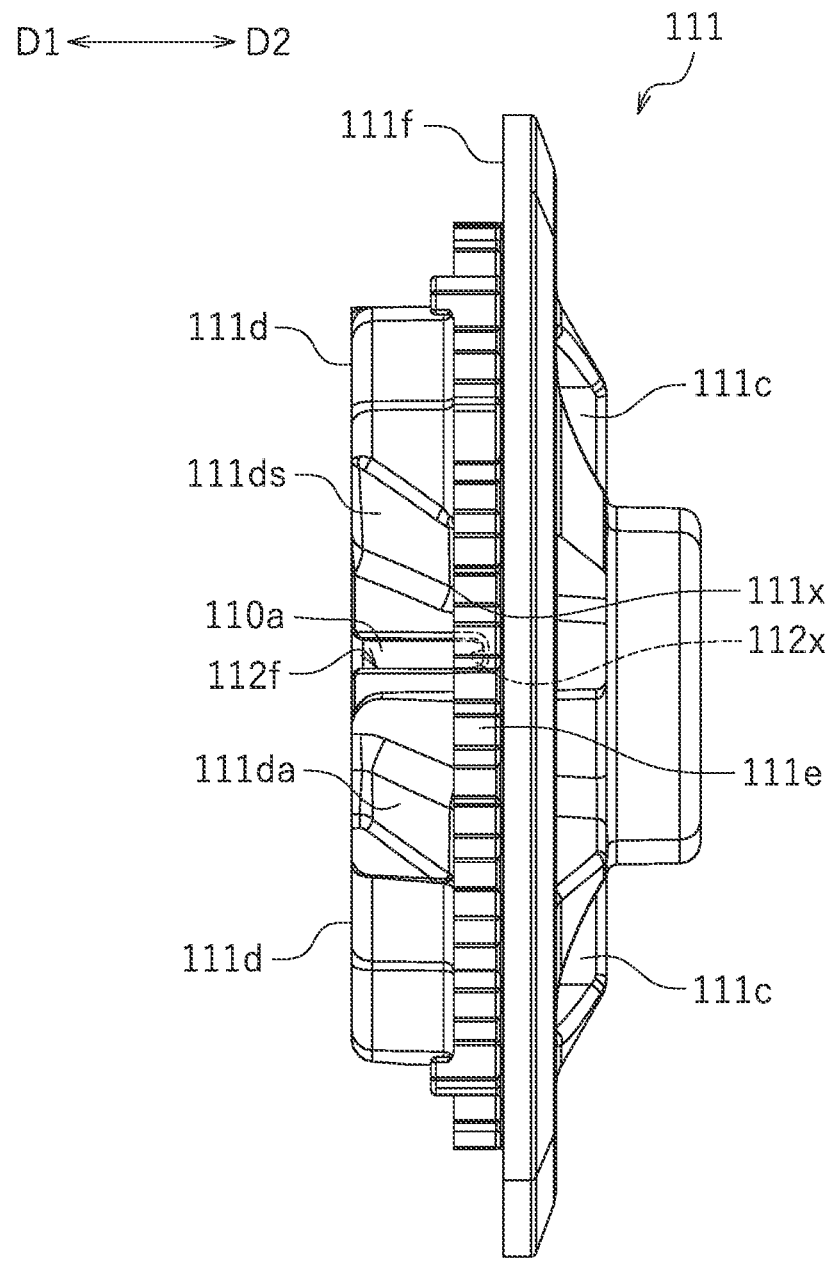
FIG. 11 is a side view showing a configuration of the plate presser according to still another modification of an example embodiment of the present invention.

In the above-described example embodiments, the end 112x of each opening 112f on the second direction D2 side is located ahead, in the first direction D1, of the end 111x of the corresponding presser-side slipper cam surface 111ds on the second direction D2 side. The end 112x is not limited to this. For example, as shown in FIG. 11, the end 112x of each opening 112f on the second direction D2 side may be ahead, in the second direction D2, of the end 111x of the corresponding presser-side slipper cam surface 111ds on the second direction D2 side.

Figure 12:
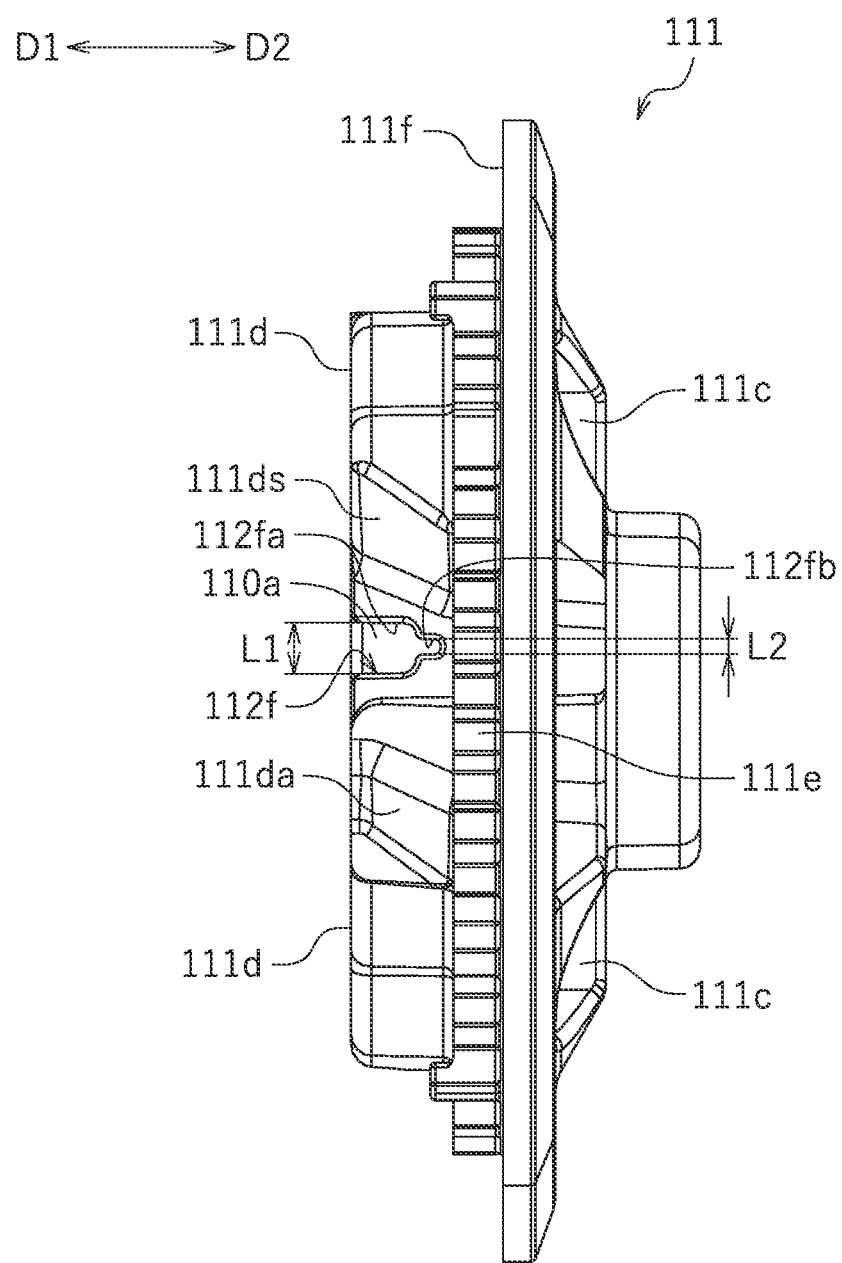
FIG. 12 is a side view showing a configuration of the plate presser according to still another modification of an example embodiment of the present invention.

In the above-described example embodiments, the openings 112f each have a constant width in a circumferential direction thereof. The openings 112f are not limited to this. For example, as shown in FIG. 12, each opening 112f may include a first portion 112fa having a first length L1 in the circumferential direction and a second portion 112fb located ahead of the first portion 112fa in the second direction D2 and having a second length L2, shorter than the first length L1, in the circumferential direction.

Figure 13:
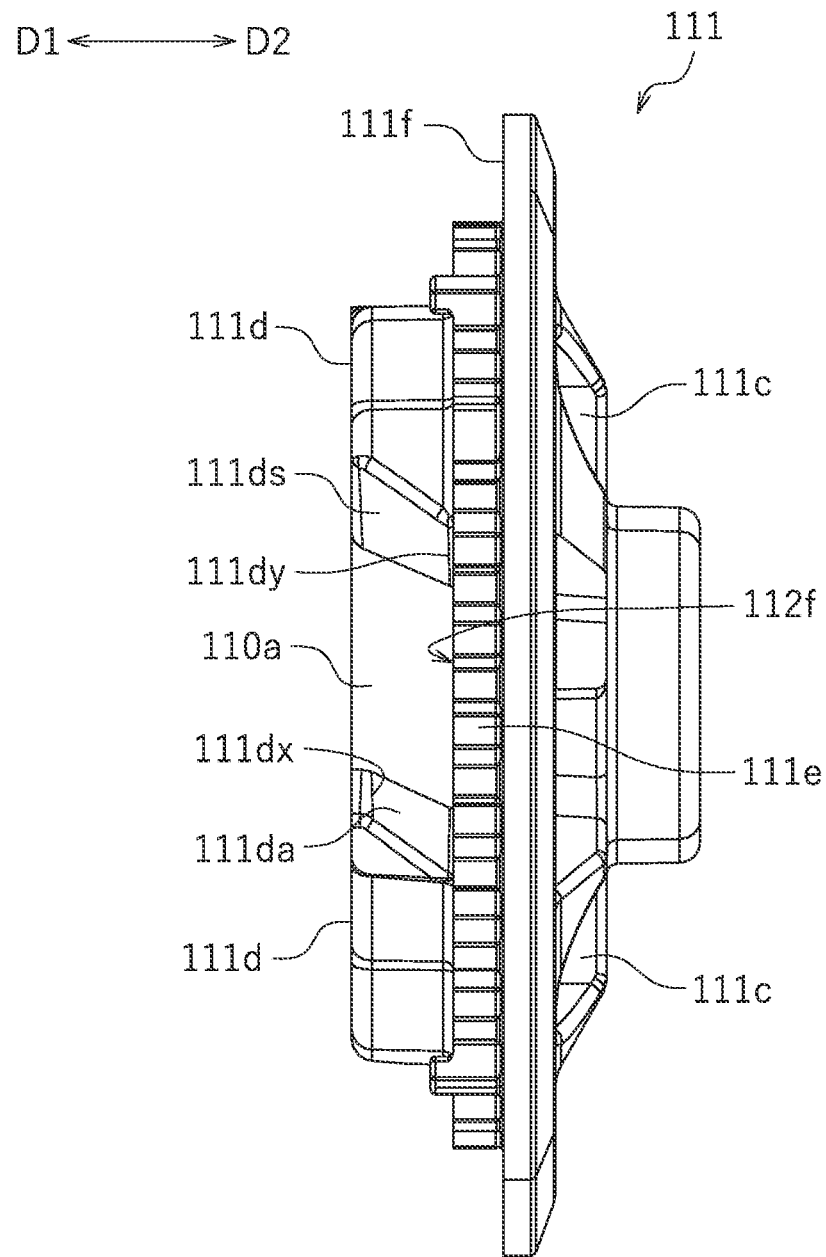
FIG. 13 is a side view showing a configuration of the plate presser according to still another modification of an example embodiment of the present invention.
Figure 14:
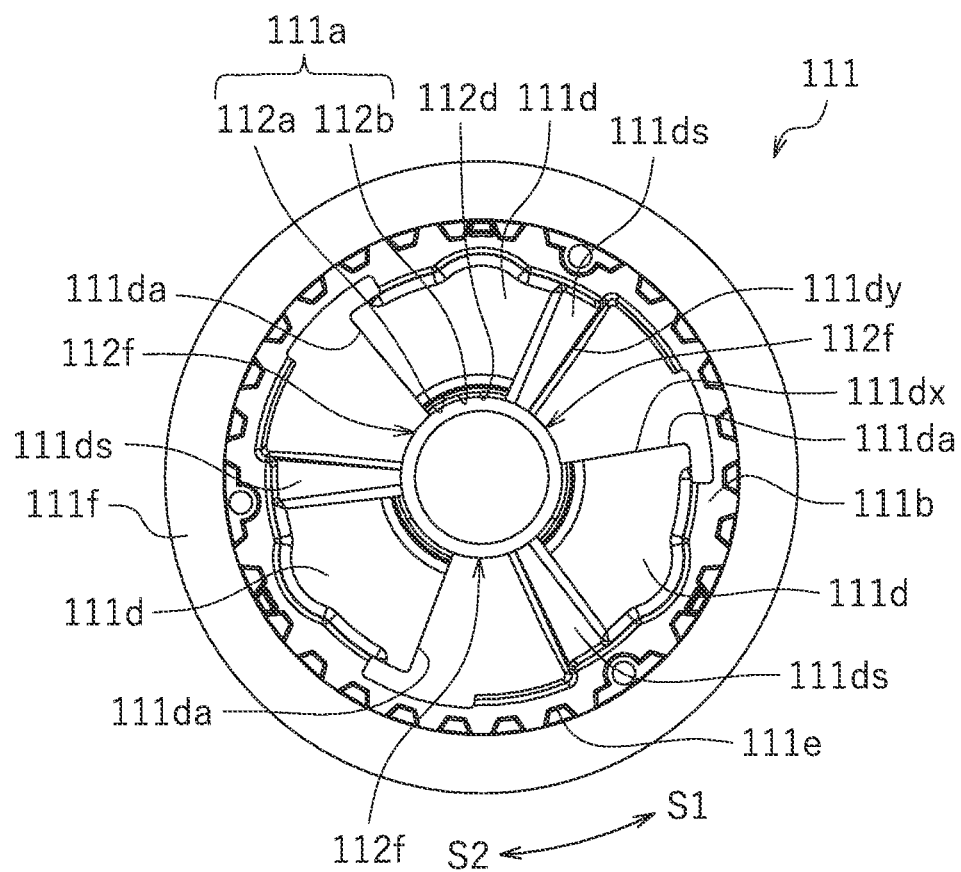
FIG. 14 is a plan view showing a configuration of the plate presser according to still another modification of an example embodiment of the present invention.

In the above-described example embodiments, the openings 112f are each formed by a portion, of the center cylindrical portion 111a, that is between the presser-side cam portions 111d adjacent to each other in the circumferential direction being partially cut off. The openings 112f are not limited to this. For example, as shown in FIG. 13 and FIG. 14, the openings 112f may each be formed by a portion, of the center cylindrical portion 111a, that is between the presser-side cam portions 111d adjacent to each other in the circumferential direction being entirely cut off. That is, as shown in FIG. 14, where, regarding two adjacent presser-side cam portions 111d adjacent to each other in the circumferential direction, a direction from one presser-side cam portion 111d toward the other presser-side cam portion 111d is referred to as a "first circumferential direction S1, and a direction from the other presser-side cam portion 111d toward the one presser-side cam portion 111d is referred to as a second circumferential direction S2, the openings 112f may each be formed from an end 111dx of the presser-side assist cam surface 111da on the first circumferential direction S1 side to an end 111dy of the presser-side slipper cam surface 111ds on the second circumferential direction S2 side.

In the above-described example embodiments, the center fitting portion 112a is slidably fitted to the outer surface of the driven shaft coupling portion 110a directly. Alternatively, the center fitting portion 112a may be fitted to the outer surface of the driven shaft coupling portion 110a indirectly with another member such as a sleeve or the like being located between the center fitting portion 112a and the driven shaft coupling portion 110a.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clutch device allowing or blocking transfer of a rotation driving force of a drive shaft to a driven shaft, the clutch device comprising:
    a clutch center including a plate holder holding an output-side rotating plate facing an input-side rotating plate rotationally drivable by rotational driving of the drive shaft, the clutch center being rotationally drivable together with the driven shaft; and
    a plate presser facing the clutch center and displaceable toward or away from the clutch center and rotatable with respect to the clutch center to press the input-side rotating plate or the output-side rotating plate; wherein
    the plate presser includes a center cylindrical portion;
    the clutch center includes a driven shaft coupling portion coupled with a tip portion of the driven shaft; and
    the center cylindrical portion includes a center fitting portion slidably fitted to the driven shaft coupling portion and a cylindrical oil receiver adjacent to the center fitting portion to receive clutch oil flowing out of a flow-out portion of the driven shaft.

2. The clutch device according to claim 1, wherein the oil receiver includes a slope at least at a portion of an inner circumferential surface thereof, the slope expanding diametrically outward toward the center fitting portion.

3. The clutch device according to claim 1, wherein the center cylindrical portion includes an oil path expansion portion in a circumferential direction in which the center fitting portion is provided, the oil path expansion portion expanding diametrically outward and defining a gap between the oil path expansion portion and an outer circumferential portion of the driven shaft coupling portion.

4. The clutch device according to claim 3, wherein the oil path expansion portion extends from the center fitting portion to the oil receiver.

5. The clutch device according to claim 1, wherein the center cylindrical portion includes an opening in a portion thereof in a circumferential direction in which the center fitting portion is provided, the opening being defined by a cut-off portion.

6. The clutch device according to claim 5, wherein the opening faces a central portion of the plate holder in an axial direction thereof.

7. The clutch device according to claim 5, wherein the opening extends from the center fitting portion to the oil receiver.

8. The clutch device according to claim 1, wherein the center cylindrical portion includes an opening defined by a cut-off portion in the circumferential direction.

9. The clutch device according to claim 8, wherein the clutch center includes a plurality of center-side cam portions located diametrically outward of the driven shaft coupling portion, the plurality of center-side cam portions each including a center-side assist cam surface to generate a force in a direction from the plate presser toward the clutch center, in order to increase a pressing force between the input-side rotating plate and the output-side rotating plate, when the clutch center rotates with respect to the plate presser, and also including a center-side slipper cam surface separating the plate presser from the clutch center, in order to decrease the pressing force between the input-side rotating plate and the output-side rotating plate, when the clutch center rotates with respect to the plate presser;

the plate presser includes a plurality of presser-side cam portions located diametrically outward of the center cylindrical portion, the plurality of presser-side cam portions each including a presser-side assist cam surface contactable with the center-side assist cam surface to generate a force in a direction from the plate presser toward the clutch center, in order to increase the pressing force between the input-side rotating plate and the output-side rotating plate, when the plate presser rotates with respect to the clutch center, and also including a presser-side slipper cam surface contactable with the center-side slipper cam surface and separating the plate presser from the clutch center, in order to decrease the pressing force between the input-side rotating plate and the output-side rotating plate, when the plate presser rotates with respect to the clutch center; and the opening is located between two of the presser-side cam portions adjacent to each other in the circumferential direction.

10. The clutch device according to claim 9, wherein the opening is located closer to the presser-side assist cam surface than to the presser-side slipper cam surface.

11. The clutch device according to claim 9, wherein regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, and in a case where, regarding the circumferential direction, a direction from one of the two presser-side cam portions toward the other presser-side cam portion is a first circumferential direction and a direction from the other presser-side cam portion toward the one presser-side cam portion is a second circumferential direction, the opening extends from an end of the presser-side assist cam surface on the side of the first circumferential direction to an end of the presser-side slipper cam surface on the side of the second circumferential direction.

12. The clutch device according to claim 9, wherein where a direction in which the plate presser approaches the clutch center is a first direction and a direction in which the plate presser moves away from the clutch center is a second direction, an end of the opening on the side of the second direction is located ahead, in the second direction, of an end of the presser-side slipper cam surface on the side of the second direction.

13. The clutch device according to claim 9, wherein where a direction in which the plate presser approaches the clutch center is a first direction and a direction in which the plate presser moves away from the clutch center is a second direction, the opening includes a first portion having a first length in the circumferential direction and a second portion located ahead of the first portion in the second direction and having a second length, shorter than the first length, in the circumferential direction.

14. The clutch device according to claim 1, wherein the center cylindrical portion is open at the center in a radial direction.

15. A motorcycle comprising the clutch device according to claim 1.

16. A clutch device allowing or blocking transfer of a rotation driving force of a drive shaft to a driven shaft, the clutch device comprising:

a clutch center including a plate holder holding an output-side rotating plate facing an input-side rotating plate rotationally drivable by rotational driving of the drive shaft, the clutch center being rotationally drivable together with the driven shaft; and a plate presser facing the clutch center and displaceable toward or away from the clutch center and rotatable with respect to the clutch center to press the input-side rotating plate or the output-side rotating plate; wherein the plate presser includes a center cylindrical portion;

the clutch center includes a driven shaft coupling portion coupled with a tip portion of the driven shaft; and the center cylindrical portion includes a center fitting portion slidably fitted to the driven shaft coupling portion and a recessed portion provided in a portion of the plate presser in a circumferential direction in which the center fitting portion is provided, the recessed portion expanding diametrically outward and defining a gap between the recessed portion and an outer circumferential portion of the driven shaft coupling portion to enable clutch oil to flow out of a flow-out portion of the driven shaft and to flow into the recessed portion.

17. The clutch device according to claim 16, wherein the clutch center includes a plurality of center-side cam portions located diametrically outward of the driven shaft coupling portion, the plurality of center-side cam portions each including a center-side assist cam surface to generate a force in a direction from the plate presser toward the clutch center, in order to increase a pressing force between the input-side rotating plate and the output-side rotating plate, when the clutch center rotates with respect to the plate presser, and also including a center-side slipper cam surface to separate the plate presser from the clutch center, in order to decrease the pressing force between the input-side rotating plate and the output-side rotating plate, when the clutch center rotates with respect to the plate presser;

the plate presser includes a plurality of presser-side cam portions located diametrically outward of the center cylindrical portion, the plurality of presser-side cam portions each including a presser-side assist cam surface contactable with the center-side assist cam surface to generate a force in a direction from the plate presser toward the clutch center, in order to increase the pressing force between the input-side rotating plate and the output-side rotating plate, when the plate presser rotates with respect to the clutch center, and also including a presser-side slipper cam surface contactable with the center-side slipper cam surface to separate the plate presser from the clutch center, in order to decrease the pressing force between the input-side rotating plate and the output-side rotating plate, when the plate presser rotates with respect to the clutch center; and the recessed portion is located between two of the presser-side cam portions adjacent to each other in the circumferential direction.

18. The clutch device according to claim 17, wherein regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, the recessed portion is located closer to the presser-side assist cam surface.

19. The clutch device according to claim 17, wherein regarding the two of the presser-side cam portions adjacent to each other in the circumferential direction, in a case where the presser-side assist cam surface of one of the presser-side cam portions and the presser-side slipper cam surface of the other presser-side cam portion are opposed to each other, the recessed portion is located closer to the presser-side slipper cam surface.

20. The clutch device according to claim 17, wherein the recessed portion is provided in the center cylindrical portion so as to expand diametrically outward.

21. The clutch device according to claim 17, wherein where the two of the presser-side cam portions are adjacent to each other in the circumferential direction, the recessed portion has a length in the circumferential direction that is shorter than a length, in the circumferential direction, from the presser-side assist cam surface of one of the presser-side cam portions to the presser-side slipper cam surface of the other presser-side cam portion.

22. The clutch device according to claim 21, wherein the recessed portion is located closer to the presser-side assist cam surface than to the presser-side slipper cam surface.

23. The clutch device according to claim 22, wherein the recessed portion is provided in an entirety of a region of the center cylindrical portion extending from at least a central portion in an axial direction thereof to an end thereof on a side of the clutch center.

24. The clutch device according to claim 21, wherein the recessed portion is located closer to the presser-side slipper cam surface than to the presser-side assist cam surface.

25. The clutch device according to claim 16, wherein the recessed portion is provided in an entirety of a region of the center cylindrical portion extending from at least a central portion in an axial direction thereof to an end thereof on a side of the clutch center.

* * * * *